(12) United States Patent
Andersson et al.

(10) Patent No.: US 11,712,842 B2
(45) Date of Patent: Aug. 1, 2023

(54) METHOD AND APPARATUS FOR MANUFACTURING A SERIES OF OBJECTS

(71) Applicant: Digital Metal AB, Höganäs (SE)

(72) Inventors: Bo-Göran Andersson, Höganäs (SE); Magnus Burgemeister, Mölndal (SE)

(73) Assignee: DIGITAL METAL AB, Höganäs (SE)

( * ) Notice: Subject to any disclaimer, the term of this patent is extended or adjusted under 35 U.S.C. 154(b) by 1385 days.

(21) Appl. No.: 15/528,449

(22) PCT Filed: Nov. 18, 2015

(86) PCT No.: PCT/EP2015/076987
§ 371 (c)(1),
(2) Date: May 19, 2017

(87) PCT Pub. No.: WO2016/079192
PCT Pub. Date: May 26, 2016

(65) Prior Publication Data
US 2017/0334140 A1 Nov. 23, 2017

(30) Foreign Application Priority Data

Nov. 19, 2014 (GB) .................................. 1420601

(51) Int. Cl.
*B29C 64/165* (2017.01)
*B29C 64/40* (2017.01)
(Continued)

(52) U.S. Cl.
CPC .......... *B29C 64/165* (2017.08); *B22F 12/222* (2021.01); *B29C 64/245* (2017.08);
(Continued)

(58) Field of Classification Search
CPC ..... B29C 64/165; B29C 64/245; B29C 64/40; B29C 64/176; B22F 10/10; B22F 12/00;
(Continued)

(56) References Cited

U.S. PATENT DOCUMENTS

| | | | |
|---|---|---|---|
| 6,113,696 A * | 9/2000 | Tseng | B33Y 30/00 |
| | | | 118/696 |
| 6,375,874 B1 * | 4/2002 | Russell | B33Y 40/00 |
| | | | 264/28 |

(Continued)

FOREIGN PATENT DOCUMENTS

| CN | 103118859 A | 5/2013 |
|---|---|---|
| DE | 102007033434 A1 | 1/2009 |

(Continued)

OTHER PUBLICATIONS

Eitel, E. "A history of gripping and gripper technologies and the available options for today's engineer." 2010. Machine Design. (Year: 2010).*

(Continued)

*Primary Examiner* — Nicholas A Wang
(74) *Attorney, Agent, or Firm* — Lando & Anastasi, LLP

(57) ABSTRACT

A method, of manufacturing a series of objects is disclosed. In the method, a layer of a manufacturing medium is provided. Portions of the layer of the medium, are bond together at at least edge regions of the layer to form a support portion. The support portion is lowered while gripping the support portion by the edge regions of the layer. A further layer of the medium is provided supported by the support portion. Portions of the further layer of the medium are selectively bound to form at least an object portion. An apparatus for performing the method is also disclosed.

30 Claims, 19 Drawing Sheets

(51) Int. Cl.
*B33Y 10/00* (2015.01)
*B33Y 30/00* (2015.01)
*B29C 64/245* (2017.01)
*B29C 64/379* (2017.01)
*B33Y 40/20* (2020.01)
*B22F 12/00* (2021.01)
*B33Y 40/00* (2020.01)
*B29C 64/357* (2017.01)
*B22F 10/14* (2021.01)
*B22F 12/63* (2021.01)
*B22F 10/47* (2021.01)

(52) U.S. Cl.
CPC .......... *B29C 64/357* (2017.08); *B29C 64/379* (2017.08); *B29C 64/40* (2017.08); *B33Y 10/00* (2014.12); *B33Y 30/00* (2014.12); *B33Y 40/00* (2014.12); *B33Y 40/20* (2020.01); *B22F 10/14* (2021.01); *B22F 10/47* (2021.01); *B22F 12/63* (2021.01)

(58) Field of Classification Search
CPC . B22F 2003/1057; B33Y 10/00; B33Y 30/00; B33Y 40/00; B23K 15/086; B28B 1/001
See application file for complete search history.

(56) References Cited

U.S. PATENT DOCUMENTS

| | | | |
|---|---|---|---|
| 9,937,557 B2 | 4/2018 | Lyons | |
| 2002/0171177 A1* | 11/2002 | Kritchman | B33Y 10/00 264/401 |
| 2007/0145629 A1 | 6/2007 | Ebert et al. | |
| 2010/0193998 A1* | 8/2010 | Crump | B22F 10/40 264/401 |
| 2012/0067501 A1* | 3/2012 | Lyons | B33Y 30/00 156/64 |
| 2013/0026680 A1 | 1/2013 | Ederer et al. | |
| 2013/0193620 A1* | 8/2013 | Mironets | B29C 64/176 264/401 |
| 2014/0048980 A1 | 2/2014 | Crump et al. | |
| 2014/0178585 A1 | 6/2014 | Swanson et al. | |

FOREIGN PATENT DOCUMENTS

| | | | |
|---|---|---|---|
| EP | 0431924 | A2 | 6/1991 |
| EP | 2289652 | A1 | 3/2011 |
| JP | 2004-255839 | A | 9/2004 |
| JP | 2006-519925 | A | 8/2006 |
| JP | 2013188845 | * | 9/2013 |
| JP | 2013-542867 | A | 11/2013 |
| WO | 2012039843 | A1 | 3/2012 |
| WO | 2016079192 | A1 | 5/2016 |

OTHER PUBLICATIONS

Search Report; dated May 8, 2015; pp. 4.
Chinese Office Action dated Jul. 4, 2019 with English summary for co-pending Chinese Patent Application No. 201580070851.6; pp. 21.
Taiwainese Office Action dated Jan. 11, 2019 with English summary for co-pending Taiwan Patent Application No. 18104137943; pp. 17.
International Search Report for PCT/EP2015/0796987 dated Feb. 18, 2016; 3 pages.
Office Action dated Aug. 4, 2020 with English translation for co-pending Japanese Patent Application No. 2017-526962; pp. 6. All pages relevant.
Japanese Office Action dated Oct. 23, 2019 with English summary for co-pending Japanese Patent Application No. 2017-526962; pp. 8.
Office Action dated Jun. 28, 2021 with English translation for co-pending Korean Patent Application No. 10-2017-7016694; pp. 19. All pages relevant.

* cited by examiner

METHOD AND APPARATUS FOR MANUFACTURING A SERIES OF OBJECTS

PRIORITY CLAIMS

This invention claims priority to PCT Application Serial No. PCT/EP2015/076987 filed Nov. 18, 2015, which claims priority to Great Britain Application Serial No. 1420601.5 filed Nov. 19, 2014. The contents of which are hereby incorporated by reference.

TECHNICAL FIELD

The present invention relates to a method and apparatus for manufacturing three-dimensional objects, and particularly to methods and apparatus which are able to manufacture a series of three-dimensional objects in a continuous manufacturing process.

BACKGROUND

Three-dimensional printing is a class of additive manufacturing technologies in which sequential layers of material in which portions of the layer are joined together are deposited into a build region so that a desired object is constructed by the joined portions of the sequential layers. At the point of deposition, the material may be liquid, granular solid or another flowable medium.

Conventionally, as the layers of material are deposited from a deposition unit, a support plate on which a first layer of material is deposited is translated downwards away from the build region so that a further layer of material can be added at the build region. The deposited layers are thus contained in a well having the build region at the top and the support plate at the bottom. The dimensions of the well, which generally correspond to the dimensions of the support plate and the maximum distance by which the support plate may be translated downward away from the build region, limit the available volume for manufacturing.

Particularly, if it is desired to manufacture a large number of objects in the same manufacturing run, the number of objects that can be manufactured are limited by the volume of the well. If it is desired to manufacture more objects than can be simultaneously accommodated in the well, then a first batch of objects must be manufactured in a first job, the batch of objects must be removed from the well, the support plate must be returned to its original position just below the build region, and a second batch or further batches of objects must then be manufactured in a second job or further jobs. Especially where each object has a maximum dimension comparable to a maximum dimension of the well, each manufactured object may requires a separate manufacturing job, and each object must be removed from the well before a further object can be manufactured. Manufacturing a large number of objects in this way is labour-intensive and time-consuming.

Accordingly, there is a need for a method of additive manufacturing which can allow a large number of objects to be formed in an efficient manner.

SUMMARY

According to a first aspect of the present invention, there is provided a method of manufacturing a series of objects. The method comprises providing a layer of a manufacturing medium. The method comprises binding portions of the layer of the medium together at at least edge regions of the layer to form a support portion. The method comprises lowering the support portion while gripping the support portion by the edge regions of the layer. The method comprises providing a further layer of the medium supported by the support portion. The method comprises selectively binding portions of the further layer of the medium to form at least an object portion.

In one implementation, the method comprises further lowering the support portion. In that implementation, the method comprises providing a yet further layer of the medium on the further layer. In that implementation, the method comprises binding portions of the yet further layer of the medium together to form a further support portion. In that implementation, the method comprises gripping the further support portion by the edge regions of the further layer. In that implementation, the method comprises releasing the support portion.

In one implementation, the further layer of the medium is provided from a position above the support portion and the support portion is released from a position below the further support portion.

In one implementation, layers of the medium including the layer and the further layer constitute a continuous column.

In one implementation, the method comprises selectively binding portions of the further layer to form additional support portions connected to the support portion such that the object portion is surrounded by the additional support portions within the layer.

In one implementation, the support portion and additional support portions form a box.

In one implementation, the box comprises an apertured portion.

According to a second aspect of the present invention, there is provided an apparatus for manufacturing a series of objects. The apparatus comprises a build region. The apparatus comprises a dispensing unit arranged to deposit layers of a manufacturing medium into the build region in which portions of the layer are selectively bound together. The apparatus comprises a supporting unit arranged below the build region to support a lower layer below the layer by the edges of the lower layer and to translate the lower layer downwards away from the build region. The apparatus is configured to selectively bind portions of successive layers in the build region so as to form an object surrounded by a surrounding structure and to support the surrounding structure at least after formation with the supporting unit.

In one embodiment, the supporting unit comprises a pair of opposing grippers arranged to apply gripping force to the lower layer in mutually opposing directions.

In one embodiment, each gripper has a clamping surface arranged parallel to the surrounding wall for gripping the lower layer at the edges of the lower layer and being movable together with the other gripper of the pair of grippers away from the build region to translate the lower layer downwards.

In one embodiment, the apparatus comprises a further pair of opposing grippers arranged to apply gripping force to the lower layer in mutually opposing directions at an angle to the mutually opposing directions of the pair of grippers.

In one embodiment, each gripper comprises an endless belt having a gripping surface arranged parallel to the surrounding wall for supporting the lower layer while progressively translating the lower layer downward and away from the build region.

In one embodiment, the apparatus further comprises a receiver arranged to receive the supporting structure after the supporting unit releases the lower layer.

In one embodiment, the apparatus further comprises a selective binding unit adapted to bind different portions of the layer with different binding strengths such that the surrounding structure is formed of regions having a different binding strength as compared to the object.

According to a third aspect of the present invention, there is provided a method of manufacturing a series of objects. The method comprises selectively binding portions of sequential layers of a column of manufacturing material so as to form a series of support structures surrounding a series of objects. The method comprises translating the column of manufacturing material downwards while adding further layers of manufacturing material at the top of the column and removing support structures from the bottom of the column, the column of material being supported by one support structure, located at the bottom of the column, which is itself externally supported by the sides of the support structure.

According to a fourth aspect of the present invention, there is provided a method of manufacturing a series of objects. The method comprises depositing into a build region successive layers of manufacturing material having portions selectively bound together to form a first object surrounded by a first support structure which is arranged at at least an edge region of the successive layers. The method comprises externally supporting the first support structure at edges of layers forming the first support structure while translating the first support structure downward away from the build region. The method comprises depositing successive layers of manufacturing material having portions selectively bound together to form a second object surrounded by a second support structure arranged at an edge region of the successive layers. The method comprises externally supporting the second support structure at edges of layers forming the second support structure while the first support structure is externally supported. The method comprises releasing the first support structure once the second support structure is externally supported. The method comprises removing the first support structure containing the object after release of the first support structure from a removal position below the build region.

According to a fifth aspect of the present invention, there is provided an apparatus for manufacturing a series of objects. The apparatus comprises a material deposition unit arranged to deposit successive layers of material having portions selectively bound together into a build region to form an object surrounded by a support structure arranged at at least an edge region of successive layers. The apparatus comprises a support unit arranged to support the support structure at edges of layers forming the support structure while translating the first support structure downwards away from the build region towards a removal region located below the build region. In the apparatus, the support unit is arranged to simultaneously support at least two sequential support structures containing respective objects arranged vertically such that when a lower support structure is released, an upper support structure remains supported and can be translated downwards to replace the lower support structure.

In embodiments or implementations of the present invention, different portions of the manufacturing medium may be bound with different binding strengths such that the surrounding structure is formed of portions having a different binding strength as compared to the object.

In embodiments or implementations of the present invention, the binding of the surrounding structure may be weaker than the binding of the object, and the binding of the surrounding structure may be subsequently released after the object is formed.

In embodiments or implementations of the present invention, the binding of the surrounding structure may be by means of a soluble binder and the binding of the surrounding structure may be subsequently released by applying an appropriate solvent for releasing the binding.

In embodiments or implementations of the present invention, the appropriate solvent may be applied by spraying the surrounding structure with or immersing the surrounding structure in the appropriate solvent.

In embodiments or implementations of the present invention, the binding of the surrounding structure may be released to release the object from the surrounding structure.

In embodiments or implementations of the present invention, the manufacturing medium used in the construction of the support structure may be subsequently recycled after the binding thereof is released.

In embodiments or implementations of the present invention, the soluble binder may be a soluble polymer.

In embodiments or implementations of the present invention, the manufacturing medium may be metal powder.

BRIEF DESCRIPTION OF THE DRAWINGS

For a better understanding of the present disclosure, and to show how the same may be carried into effect, reference will be made, by way of example only, to the accompanying Drawings, the contents of which are summarised as follows.

DETAILED DESCRIPTION

The present disclosure relates to additive manufacturing technologies in which an object is constructed from a series of successively deposited layers, portions of which are joined together both within the layer and with portions of an underlying layer. Such processes can be realised by the solidification of layers of fluid polymer, for example by directed UV light; the selective sintering of layers of granular material such as metal powders, for example by a laser; the selective binding of successive layers of granular material by the application of drops of binder, for example by binding ceramic powder by the application of drops of adhesive; or the selective deposition of strong construction material on the one hand and weaker support material on the other hand in a layer, for example using hot-melt or photocurable polymers.

The disclosed exemplary embodiments given below will be explained in relation to powder bed and ink jet head 3D printing, in which binder is selectively jetted from a scanning ink jet head onto a powder bed. The present disclosure is advantageously applied to such configurations involving a granular manufacturing material which is deposited in a layer by a dispensing unit and which is subsequently selectively bound together by a selective binding unit. However, as may be appreciated, the disclosed technique is also of applicability to other methods of additive manufacturing, for example by appropriate selection of print head and deposited medium.

Figure 1:
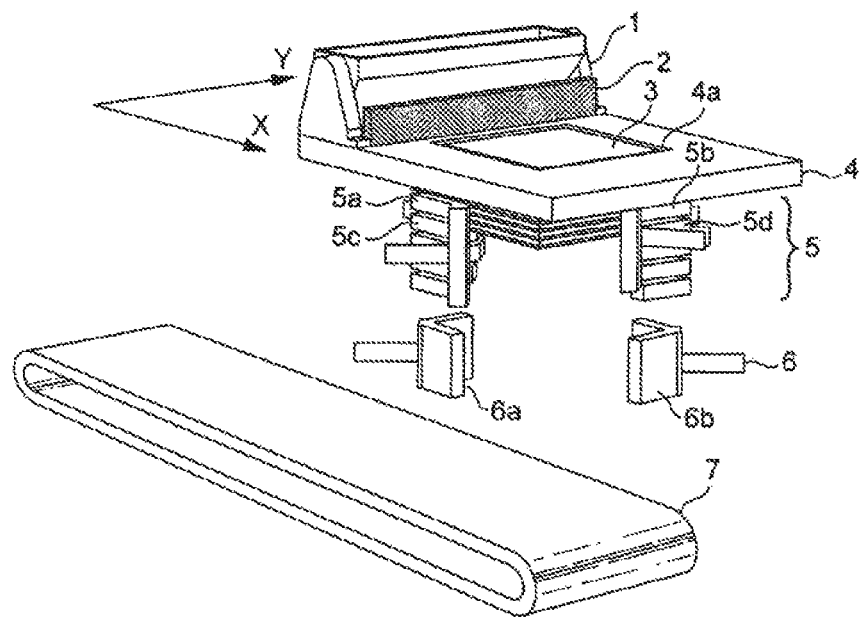
FIG. 1 shows a manufacturing apparatus according to a first embodiment.

FIG. 1 shows a first embodiment of the present disclosure. In the embodiment of FIG. 1, a table 4 is provided, having a an upper surface in which a well 4a is formed. The upper surface may be planar. Also shown in FIG. 1 is powder dispenser 1, which is arranged to travel in a first direction X across the upper surface of table 4. Powder dispenser 1 has at least one dispense orifice from which powder may be evenly dispensed as a layer into well 4a which defines a build region while powder dispenser 1 traverses the well 4a. The dispense orifice may be sufficiently wide in a second direction Y perpendicular to the first direction so as to dispense an even layer of powder into well 4a across the width of well 4a in the second direction. Alternatively, the dispense orifice may be of lesser width and may scan the length of powder dispenser 1 in the second direction so as to evenly dispense a layer of powder into the well.

Also shown in FIG. 1 is print head 2 acting as a selective binding unit, which is in the present embodiment arranged at a front edge of powder dispenser 1 in the first direction and contains an ink-jet unit arranged to translate across the front of the powder dispenser 1 in the second direction. Alternatively, print head 2 may comprise a single ink jet head extending the width of the well 4a and being fixed in the second direction. Although in the embodiment of FIG. 1 the print head is fixed to a front edge of powder dispenser 1, the print head may alternatively be provided so as to be able to translate independently of powder dispenser 1 in the first direction across well 4a.

Well 4a is not only open at the upper surface of table 4a, above which the powder dispenser and print head are arranged to move, but also extends so as to open at a lower surface of table 4, thereby connecting the upper surface and lower surface of table 4.

Below well 4a is arranged feed mechanism 5 acting as a supporting unit, which comprises two pairs of grippers 5a, 5c and 5c, 5d. Each pair of grippers is arranged to oppose each other across a space corresponding in shape and dimensions to well 4a but located below well 4a. Each pair of grippers has gripping surfaces arranged to apply inward pressure in mutually opposing directions. The grippers thus are able to apply gripping force to the edge of an object having a comparable shape to well 4a and located just below well 4a.

In the embodiment of FIG. 1, the pairs of grippers are located at positions corresponding to opposing corners of well 4a, and having gripping surfaces which correspond in shape to the corresponding corners of well 4a. In the embodiment of FIG. 1, both the first pair of grippers 5a, 5b and the second pair of grippers 5c, 5d are arranged to correspond to the same opposing pair of corners as each other. However, in an alternative configuration, the first pair of grippers may be associated with a first pair of corners and a second pair of grippers is associated with a second pair of opposing corners, such that the directions in which the first pair of grippers and the second pair of grippers respectively face each other across the well are at an angle, more particularly a right angle. Each of the first pair of grippers and the second pair of grippers may independently be inwardly driven and outwardly retracted from the space below the well thereby to respectively apply and release gripping force, and each of the first and second pair of grippers may be independently translated upward and downward relative to the well 4a in either the inwardly driven or outwardly retracted state.

Below the feed mechanism 5 is located a removal mechanism acting as a receiver unit having a further pair of removal grippers 6a, 6b also having respective gripping surfaces, which also correspond to opposing corners of well 4a and which also may be inwardly inserted and outwardly retracted to respectively apply and release a gripping force on an object located between the grippers.

Finally, below removal mechanism 6 is located conveyor 7, which acts as a transport unit for transporting items placed thereon.

Figure 2:
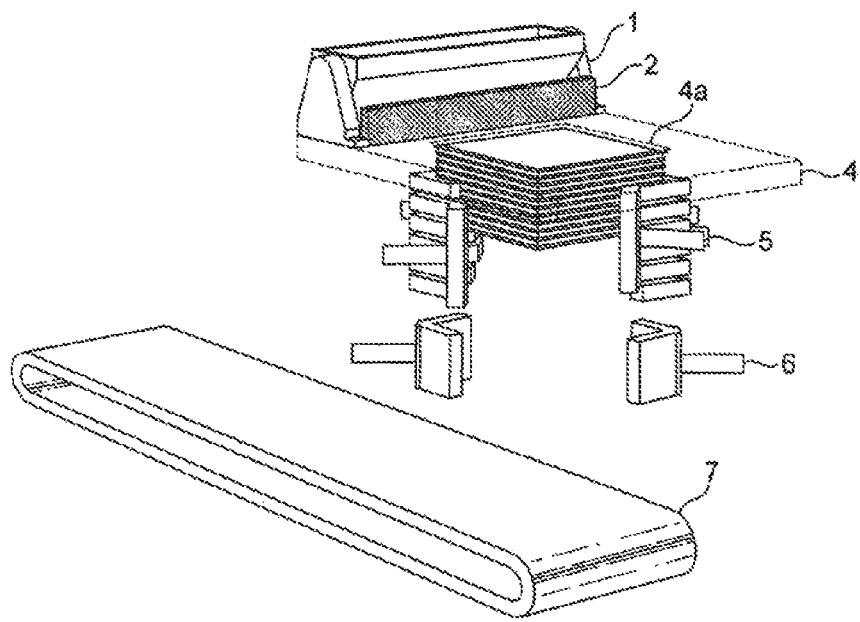
FIG. 2 shows an alternative view of the embodiment of FIG. 1.

FIG. 1 shows the apparatus in a configuration before manufacturing begins. In well 4a is located start plate 3, which acts as an initial support structure for the first layer of powder to be dispensed from powder dispenser 1. At the start of manufacturing, as may more clearly be seen in FIG. 2 in which table 4 is rendered transparent, start plate 3 is gripped by at least the first pair of grippers 5a, 5b of the feed mechanism such that its surface is coplanar with the upper surface of table 4. In fact, in FIGS. 1 and 2, the both the first and the second pair of grippers are gripping, and thus supporting, the start plate.

Figure 3A:
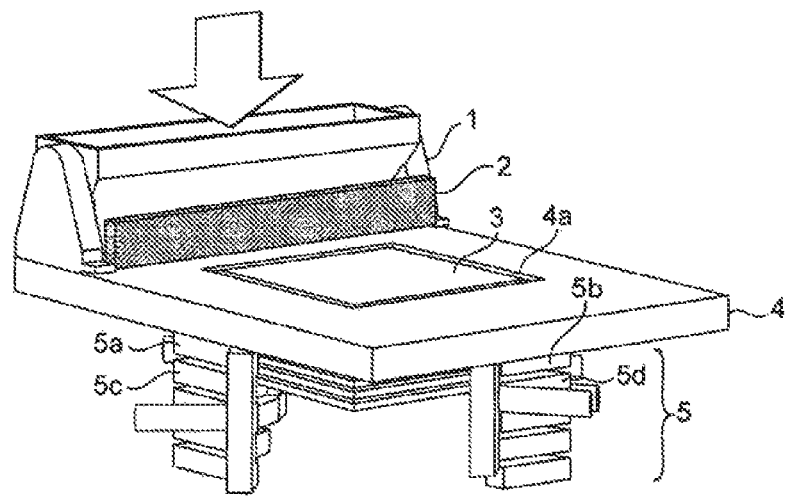
FIGS. 3a to 3i show a sequence of operations of the apparatus of FIG. 1 being an implementation of a manufacturing method.
Figure 3B:
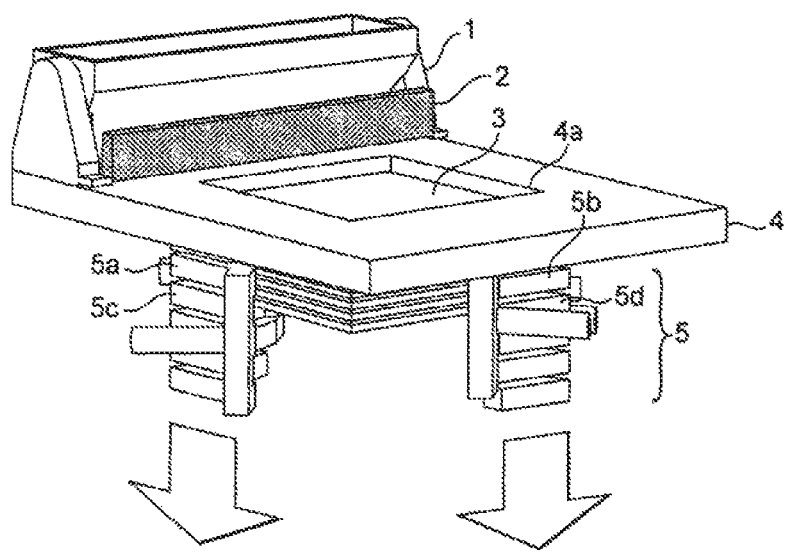

From the position shown in FIG. 3a, the feed mechanism 5, which applies gripping pressure to the edges of start plate 3, is operable to translate each of the first pair of grippers 5a, 5b and the second pair of grippers 5c, 5d together downward so as to translate the gripped start plate 3 downward relative to well 4a. This allows a space to be created in well 4a so as to allow a first layer of powder to be dispensed from the powder dispenser into at least a portion of well 4a above start plate 3. This state is shown in FIG. 3b. The feed mechanism 5 need only translate the plate a very small distance downward in order just to provide sufficient depth to allow one cross-sectional layer of the manufacturing process to be created.

Figure 3C:
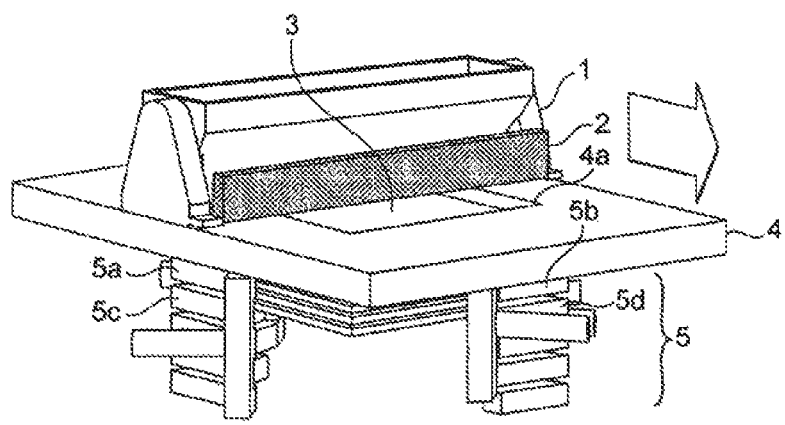

From the state of FIG. 3b, as shown in FIG. 3c, the powder dispenser translates across well 4a in the first direction to dispense a uniform layer of powder on top of start plate 3 within well 4a. If the layer of powder is filled to the upper surface of table 4, a smoothing unit, not shown, such as a scraper or roller may be translated across the upper surface of table 4 so as to smooth and level the upper surface of the thin layer of powder located on top of the start plate 3. The smoothing unit may be an integral part of dispenser 1, or may be separately provided.

Figure 3D:
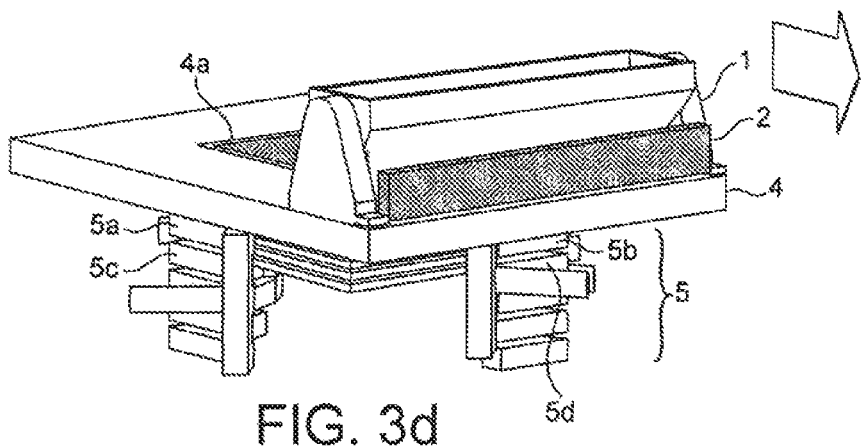

After the powder has been dispensed, the state of the apparatus is as shown in FIG. 3d.

Figure 3E:
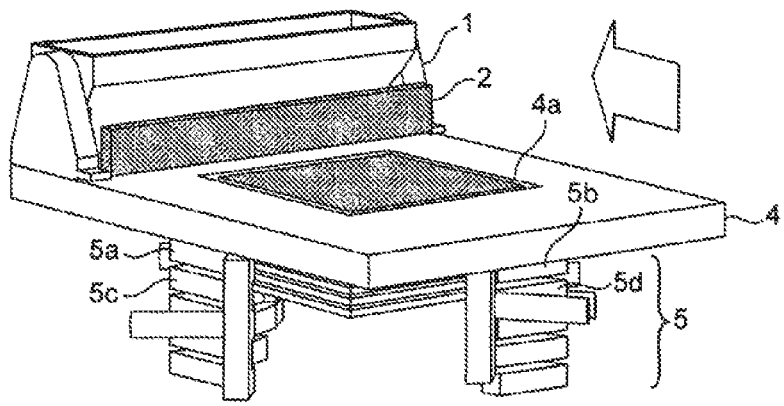

From the position shown in FIG. 3d, the powder dispenser is retracted to reach the stage shown in FIG. 3e. From this state, the print head 2 is translated across the well 4a to jet binder to selective locations on the layer of powder, thereby selectively to join portions of the powder together. In an alternative configuration, the print head 2 can be fixedly located behind powder dispenser 1 in the first direction, and the power dispensing and binder jetting operation can be carried out in a single pass of the combined powder dispenser and print head in the first direction.

During or after either or both of the forward or reverse passes, where the binder is curable, a curing unit, such as an ultraviolet light source in the case of ultraviolet-curable binders, may be passed over the build region to cure the binder. Where the binder cures with time, a separate cure unit may not be necessary. The cure unit may be independently movable in the first direction over the build region, or may be fixed to an edge of dispenser 1 or print head 2.

In the present embodiment, the print head is controlled so as to selectively bind together the powder in at least an edge region of the well 4a, in order to form the support structure as further described below.

From the position of FIG. 3e, the powder dispenser 1 and print head 2 return to the position shown in FIG. 3a. The feed mechanism 5 then translates the start plate 3 a further incremental distance downward to allow a further layer of powder to be dispensed into the well on top of the dispensed and at least partially-bound layer now existing on top of start plate 3, as shown sequentially in FIGS. 3b to 3d.

Notably, since at least the edge region of the previous layer has been joined together by the action of the binder, even though the start plate 3 may have by this point descended below the lower surface of table 4 and may thus have fully exited well 4a, the solidified edge portions of the layer of powder above the top surface of plate 3 constrains the layer of powder and supports one or more successive layers of powder deposited thereon. Therefore, the motion of the printing plate and the lowering of the start plate 3 shown in FIGS. 3a to 3e may be continuously repeated until a box-like support structure has been manufactured on top of start plate containing essentially unbound powder, without requiring that the well 4a formed in start plate 4 extend the full depth of the support structure.

Figure 3F:
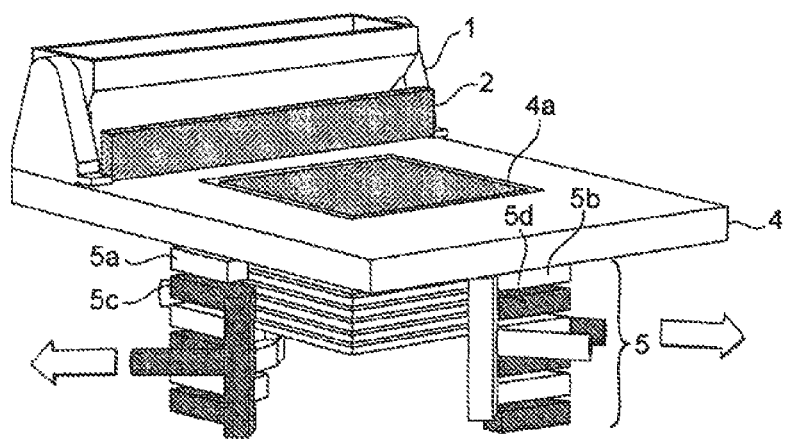
Figure 3G:
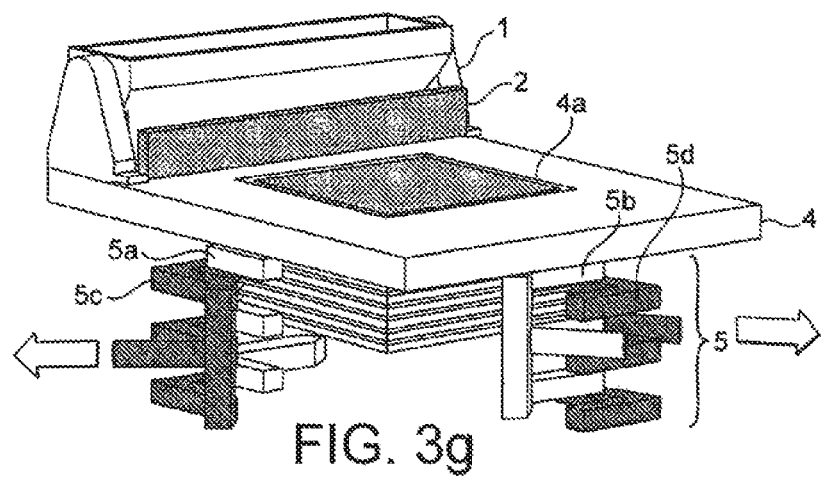
Figure 3H:
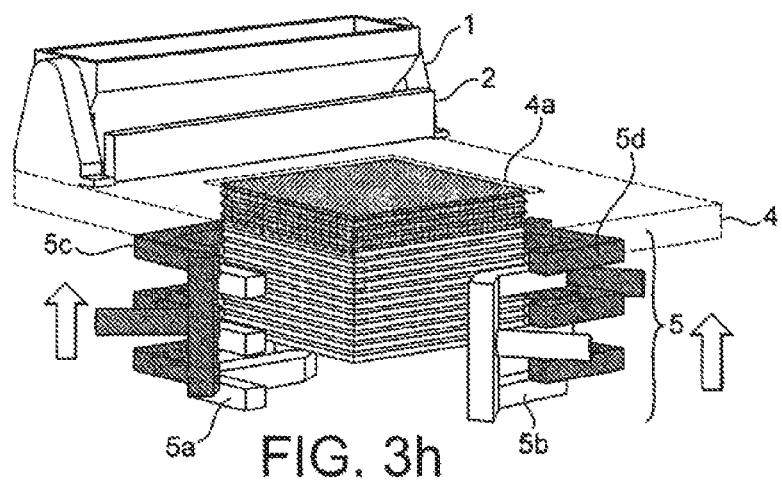
Figure 3I:
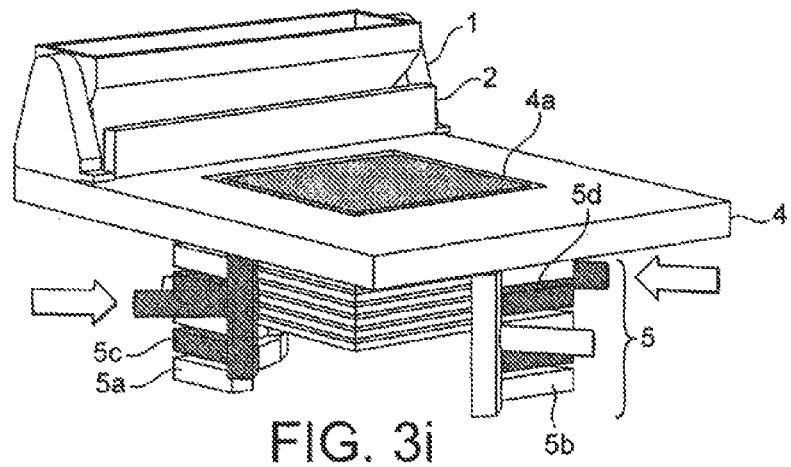

In this state, as shown in FIG. 3f, the second pair of grippers 5c, 5d may be released as shown in FIG. 3f while the first pair of grippers 5a, 5b remain engaged with the start plate 3. This state is shown in FIG. 3g. The second pair of grippers may then be translated upwardly toward build region 4a as shown in FIG. 3h, and may then be inwardly applied so as to grip the support structure formed at least in part by the solidified edge regions of the successive layers of powder passing through well 4a. This state is shown in FIG. 3i. As may be appreciated, this process may be continued for an arbitrary height of the box-like support structure, the first and second pairs of grippers alternating in gripping the support structure at successively higher positions on the walls of the support structure as the support structure as a whole descends from the build region.

This process has the advantage that the print head may be controlled, while manufacturing the support structure, to also manufacture a desired object by selectively solidifying other portions of successive layers than the portions which form the support structure. The maximum dimensions of the manufactured object are limited only by the interior space of the support structure, which as explained above can be of essentially arbitrary height, limited only by the strength of the binding and the available depth below the well.

Using this process, it also possible to sequentially manufacture a series of objects, which may be the same or different, in a continuous manufacturing process, in which successive layers of material are added to the build region, and successive support structures, each of which may contain one or more desired objects, are removed from below the feed mechanism 5 after they are completed. This can be understood by considering again FIG. 3a. However, instead of the previous situation described in FIG. 3a, in which a start plate 3 is located in the well, the well should now be considered to contain one or more substantially unbound layers of powder contained by the walls of the well and supported on top of a previously-manufactured box-like support structure, which may contain an object, the top of which now fulfils the function of the start plate 3. The top of the support structure may be closed, or may be open. As the support structure is successively lowered by the feed mechanism 5, a new support structure, which also may contain an object, is manufactured as described above from successive layers deposited in well 4a. The finished, lower support structure is held by at least one pair of grippers 5a, 5b of feed mechanism 5 until a sufficient height of the unfinished, upper support structure has been formed, at which point the other pair of grippers 5c, 5d may be applied to support at least the upper support structure. The whole column of powder including the finished lower and unfinished upper support structures are translated downward from the well 4a as the unfinished upper support structure is manufactured, together with any respective objects which the upper and lower support structures may contain. Once the unfinished upper support structure is supported by at least a one pair of grippers of feed mechanism 5, the grippers supporting the lower, finished support structure may be outwardly removed to release the finished lower support structure from the feed mechanism 5.

Since there is at least one layer of unbound powder, or at least a partly unbound layer, between the lower, finished support structure and the upper, unfinished support structure, the continuous column of powder, bound and unbound, consisting of the lower support structure and the upper support structure together with the unbound powder and objects contained therein, will separate at the layer of unbound powder. The lower, finished support structure may thus drop away from the feed mechanism. In the embodiment of FIG. 1, removal mechanism 6 comprises a second pair of grippers which are applied to the lowermost finished support structure in the column of powder so as to provide a controlled separation of the lower support structure from the remainder of the column. Since the upper, unfinished support structure arranged above the lower, finished support structure is already held by the first pair of grippers 5a, 5b, even though the lower, finished support structure is removed, further layers of powder may be deposited into well 4a and the manufacturing process can continue.

In the embodiment of FIG. 1, removal mechanism 6, having gripped the lowermost support structure in the column and having separated it form the column of powder, is arranged and controlled to deposit the support structure on conveyor 7 such that the support structure, and the object which it may contain, may be translated away from the apparatus to, for example, a firing step, a sintering step, a baking step, a curing step, an inspection step, a painting step, another further manufacturing step or a packaging step.

Figure 4A:
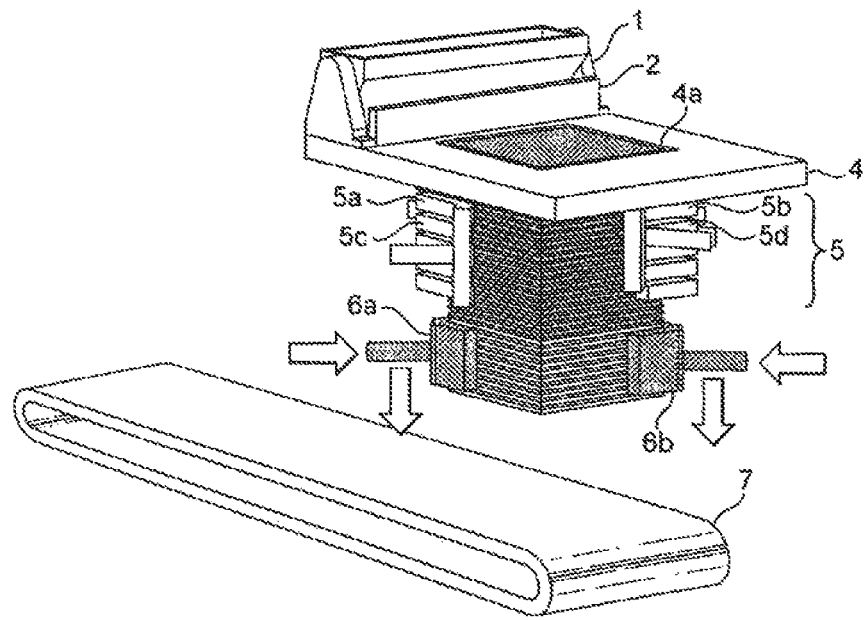
FIGS. 4a to 4c show a sequence of operations of the apparatus of FIG. 1 in which an object is removed from the apparatus.
Figure 4B:
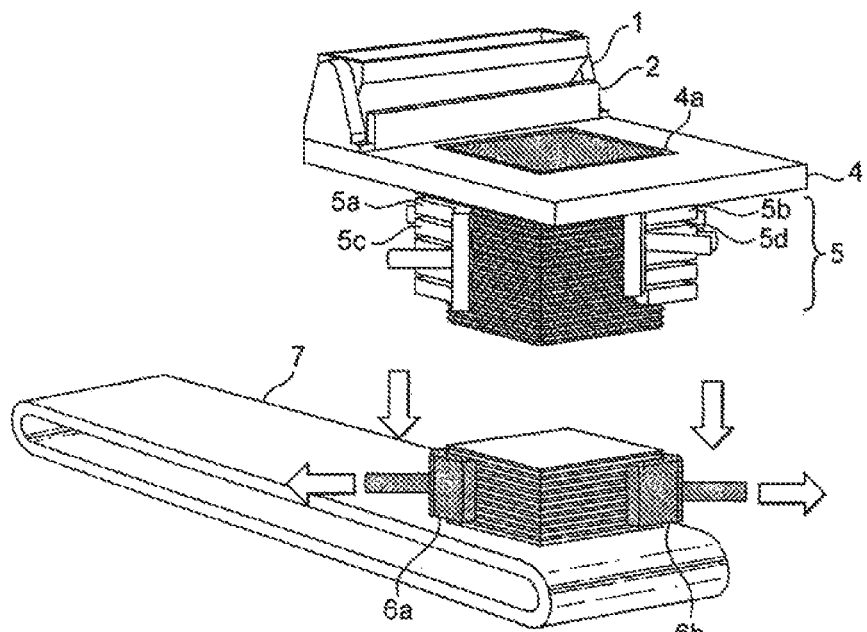
Figure 4C:
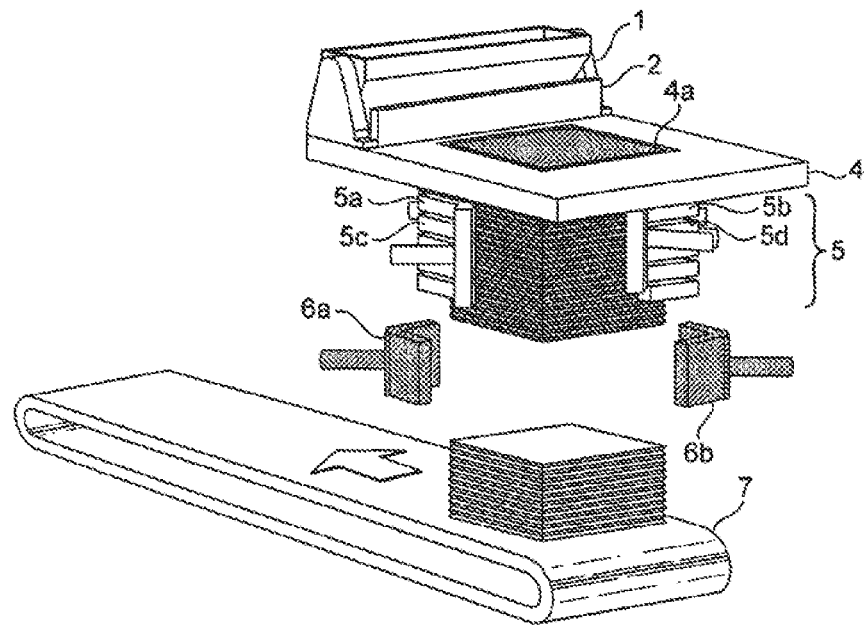

Such an operation is shown in the sequence of FIGS. 4a to 4c. In FIG. 4a, the grippers 6a, 6b of the removal mechanism 6 are applied to the walls of the support structure. The grippers 6a, 6b then transfer the support structure down and away from the remaining column of material so as to separate the support structure, and the object it contains from the column. In FIG. 4b, the support structure is placed by the removal mechanism on the conveyor 7, and is then released by retraction of grippers 6a, 6b. In FIG. 4c, the removal mechanism is arranged at the position corresponding to that shown in FIG. 4a to receive a next support structure. The support structure placed on conveyor 7 is transported away in the direction of the arrow to a subsequent step.

The above-described process can be carried out indefinitely, provided that a suitable supply of powder and binder is available. The start plate 3 is only required when starting the manufacturing process, in order to provide a stable base for the unbound powder which is first deposited. After the start plate 3 has been released from the feed mechanism, continuous manufacturing of a series of support structures, each including manufactured objects, can continue, the column of powder being at all times supported at least by the manufactured support structure supported lowermost in the feed mechanism 5. Therefore, a fully continuous manufacturing process is possible, with powder and binder being added to the well 4a to form the support structure and any desired object contained within the support structure, and completed support structures together with the objects which they may contain being removed at the bottom of the feed mechanism 5 by removal mechanism 6 and being transported away by conveyor 7.

The construction of the support structure is not particularly important provided that it is able to support the powder column and to constrain the powder from flowing from the sides or through the base of the support structure. Many powders, when packed, will not flow through an apertured surface. Therefore, the walls and base of the support structure need not be solid, but could be aperture or formed as a mesh. This is especially useful to enable a manufactured object contained within the support structure to be easily released. Once the support structure has been released from the feed mechanism and, for example, is supported by the grippers 6a, 6b of the removal mechanism 6, the box may be gently shaken to disturb the powder and to allow the powder to flow through the apertured portions of the box. The waste powder, and optionally the support structure itself, can then be recovered in a silo for optionally cleaning and then recycling back into the powder dispenser.

Figure 5:
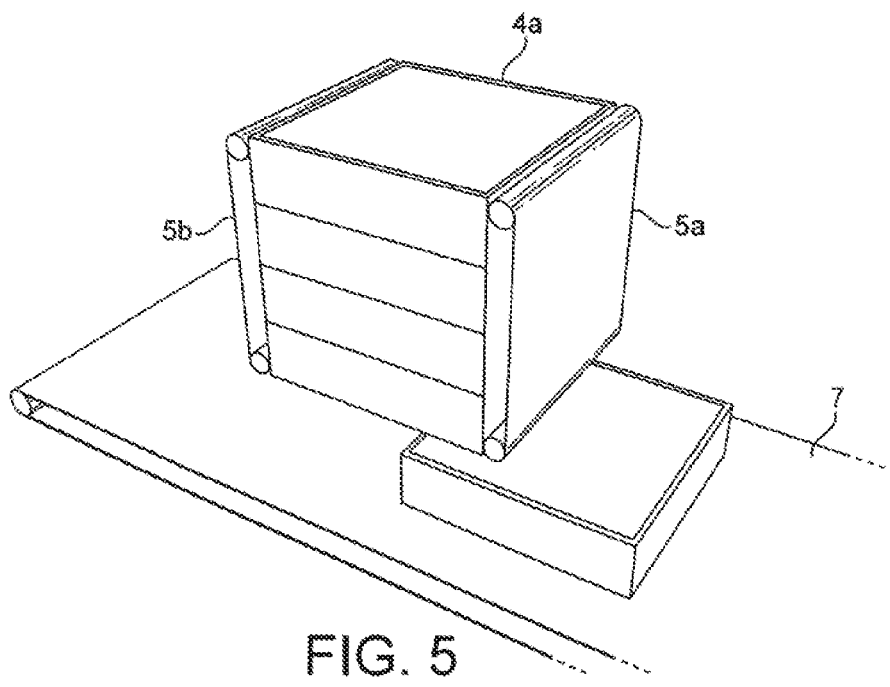
FIG. 5 is a view of an alternative feed mechanism employing belts.

While the above embodiment has been described as having a feed mechanism having two pairs of grippers which are inserted and retracted to respectively grip and release side portions of the supporting structure, alternative configurations are possible. One such configuration is shown in FIG. 5, in which the first and second pairs of grippers of FIG. 1 are replaced with the first and second belts 5a and 5b. Belts 5a and 5b are endless and resilient, and have outwardly-facing gripping surfaces arranged spaced apart across the space below the well 4a to grip the sides of the support structures as they descend from their manufacture in well 4a to their release at a lower end of belts 5a and 5b. Therefore the support structures are able to be supported at all times at their edge portions while descending. In the embodiment of FIG. 5, removal mechanism 6 may be omitted. In this case, the lowermost support structure is simply released to drop onto conveyor 7 which translates the support structure, the unbound powder contained inside, and any manufactured object within the support structure in the direction shown by the arrow.

Other forms of grippers are also possible. For example, pairs of grippers operating on alternate pairs of corners of the support structure may be provided.

In some configurations, the element which engages with the edge of the support structure, for example, the surface of the belt, may only be provided on one side of the column. The opposite face of the column may face a smooth sliding surface only.

The support structure may be manufactured to have a gripping pattern created on the outside to enable the support structure to be more easily gripped, and the gripping surfaces may be formed to have a corresponding gripping pattern to that of the support structure.

Figure 6A:
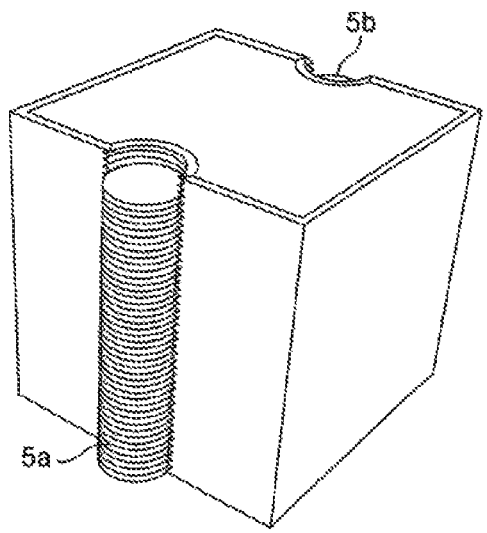
FIGS. 6a and 6b are views of alternative feed mechanisms employing screws.
Figure 6B:
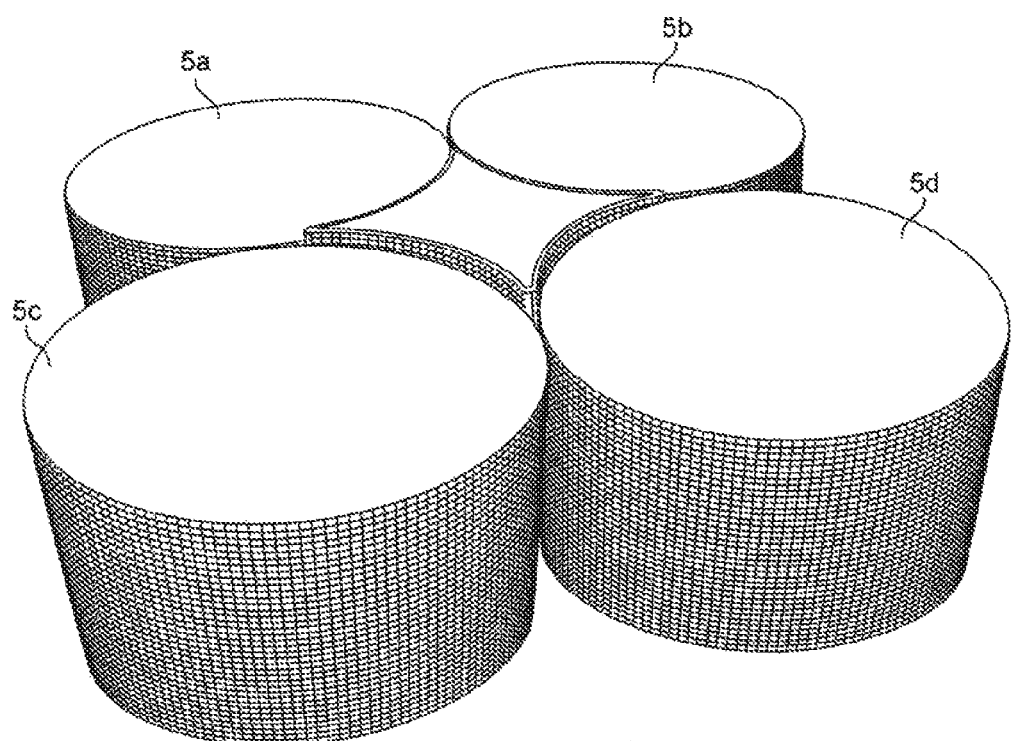

In another variant, it is possible to provide one or more rotating screws which are arranged to engage with an edge of the support structure in the manner of a worm drive so as to provide the needed support and translation to the support structure. Such screws may project into the build region to grip a correspondingly-formed portion of the support structure. In some configurations, the correspondingly-formed portions of the support structure may be formed, at least in part, around a suitable portion, such as an upper portion, of the screw. Such a configuration having two screws 5a, 5b arranged at opposite sides of the column is shown in FIG. 6a. An alternative configuration, in which the screws 5a, 5b, 5c, 5d are larger, provided on four sides of the column, and extend further into the build region is shown in FIG. 6b. In some configurations, for example especially in connection with a rotary table, the screw may extend into or through a central position of the build region such that the support structure is arranged around the screw. The central position may coincide with the axis of rotation of the material dispenser of a rotary table.

Figure 7A:
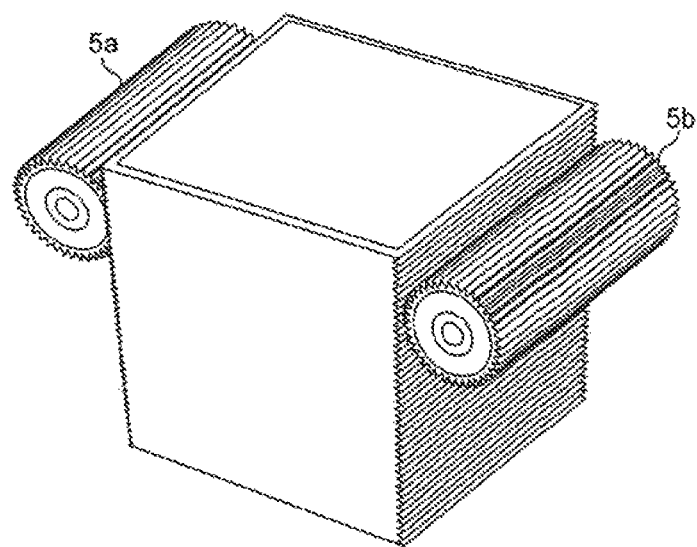
FIGS. 7a to 7d are views of alternative feed mechanisms employing toothed drive rollers.
Figure 7B:
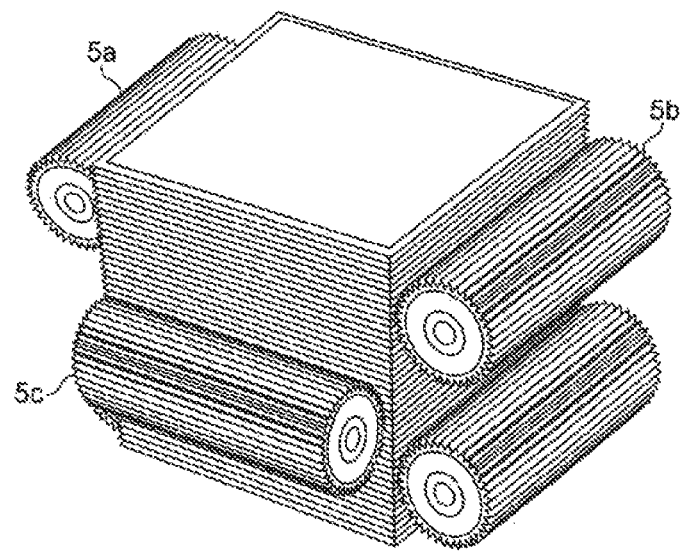
Figure 7C:
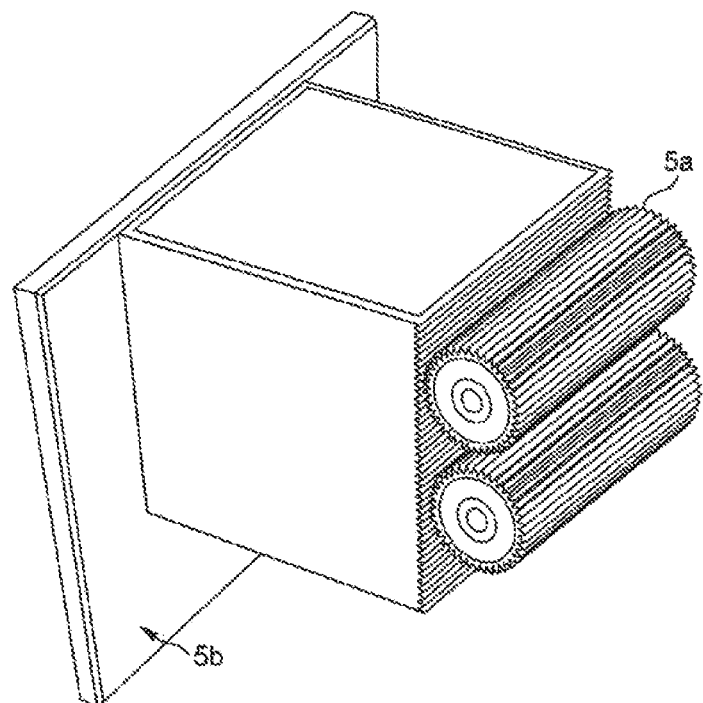
Figure 7D:
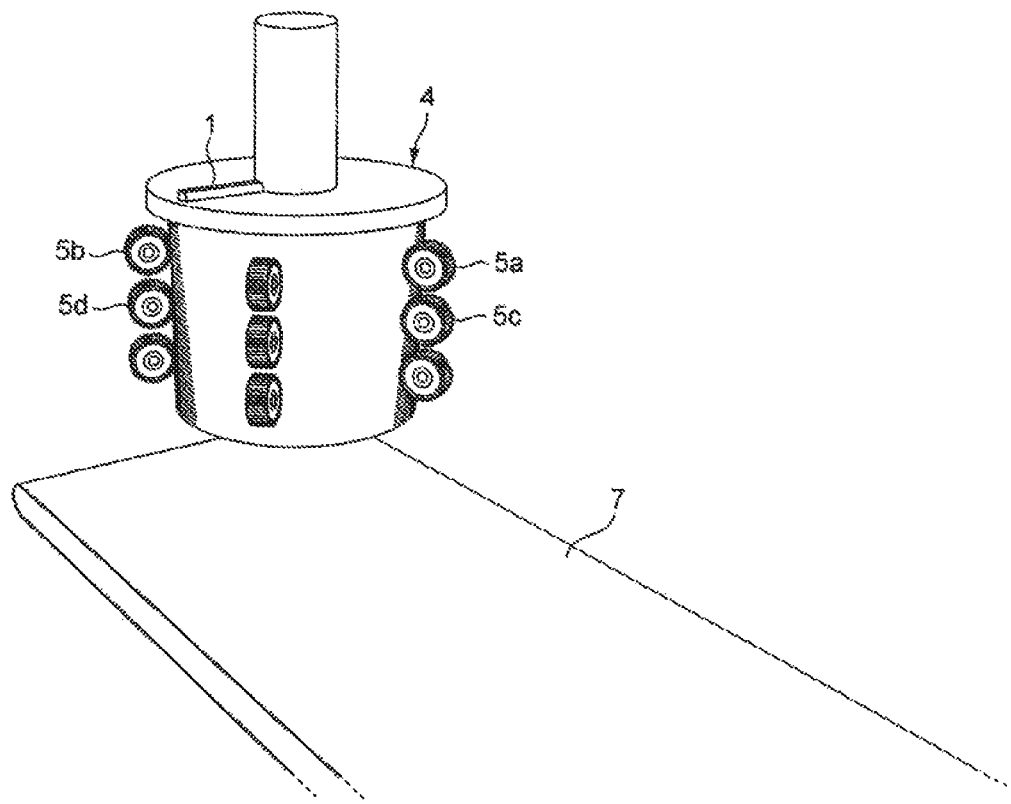

In a further variant, it is possible to provide, in place of each described gripper, one or more drive gears or toothed rollers which are arranged to engage with one, two or more edges of the support structure in the manner of a rack and pinion drive so as to provide the needed support and translation to the support structure. It may be preferable for the edge regions of the layers making up the support structure to be formed to have a corresponding toothed portion or ridged portion on an edge or wall formed to oppose each gear. Such a configuration, having one pair of opposed rollers 5a, 5b, is shown in FIG. 7a. An alternative configuration, having two pairs of opposed rollers 5a, 5b, 5c, 5d arranged at right angles to each other and one pair 5a, 5b being arranged below the other pair 5c, 5d, is shown in FIG. 7b. FIG. 7c shows a configuration in which a toothed roller 5a is arranged on one side only of the column, and the other side of the column faces a smooth surface 5b. FIG. 7d shows a configuration in which pairs of toothed rollers 5a, 5b, 5c, 5d are arranged beneath a rotary table 4, as a further alternative. A plurality of such sets of gears or toothed rollers in series along the column can make up the feed region so as to allow an upper support structure to remain supported when a lower support structure is released. Two or more gears or rollers, or sets of such gears or rollers, arranged in series, can be provided in such a feed mechanism.

Figure 8A:
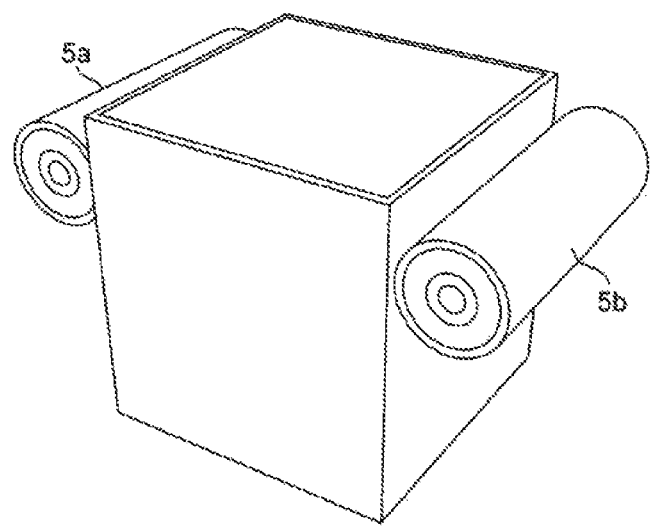
FIGS. 8a to 8c are views of alternative feed mechanisms employing resilient or textured drive rollers.
Figure 8B:
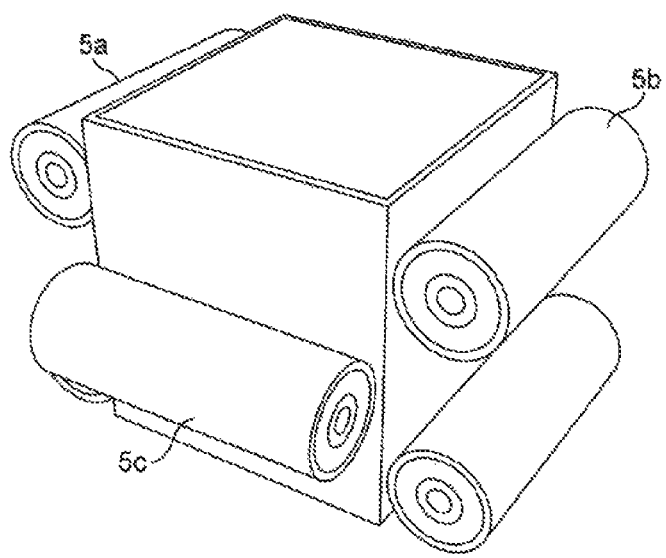
Figure 8C:
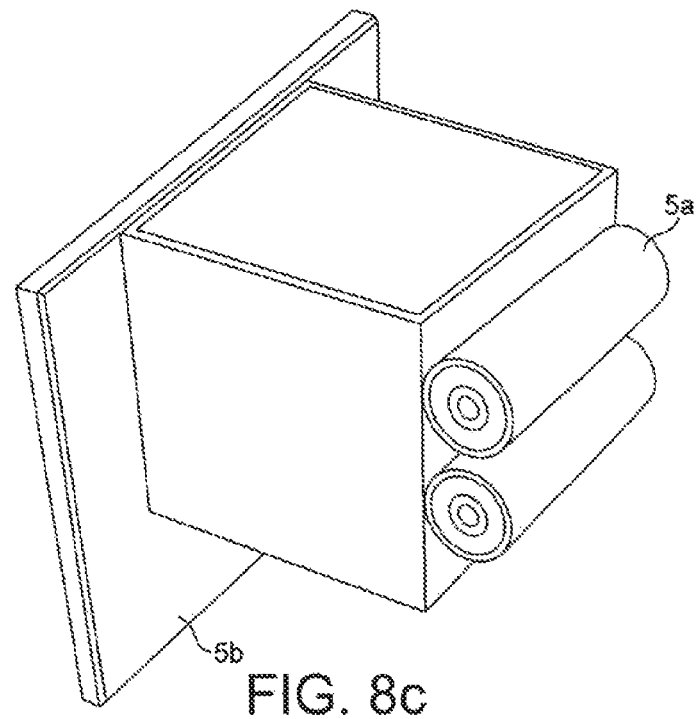

In a yet further variant, it is possible to provide a series of resilient rollers, or alternatively textured rollers, which are arranged to apply pressure to an edge of the support structure so as to provide the needed support and translation to the support structure. Such a configuration, having one pair of opposed rollers, is shown in FIG. 8a. Also for this approach, an alternative configuration having two pairs of opposed rollers which are arranged at right angles with one pair being arranged below the other, is shown in FIG. 8b. FIG. 8c shows a configuration in which a resilient roller 5*a* is arranged on one side only of the column, and the other side of the column faces a smooth surface 5*b*. Again, a plurality of such sets of rollers in series along the column can make up the feed region so as to allow an upper support structure to remain supported when a lower support structure is released. Two or more rollers, or sets of such rollers, arranged in series, can be provided in such a feed mechanism.

In the disclosed configurations, there is no requirement that the feed mechanism translate the layers only in a vertical, that is, downward, direction. As can be imagined with, for example, the belts of FIG. 5, the feed mechanism can be inclined so as to translate the layers forming the powder column at an angle to the vertical, imparting a lateral component also to the movement of the layers. Especially in such a configuration, the element which engages with the edge of the support structure, for example, the surface of the belt, may only be provided on one side, preferably an underside, of such an inclined column. The opposite face of the inclined column may face a smooth sliding surface for containing the unbound powder, only. Examples of such configurations are shown in FIGS. 9*a* to 9*f*.

Figure 9A:
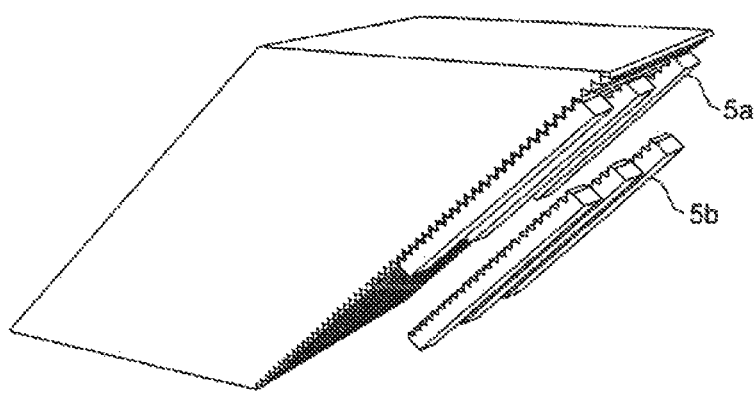
FIGS. 9a to 9f are views of alternative feed mechanisms in which the column of material in the feed mechanism is inclined.
Figure 9B:
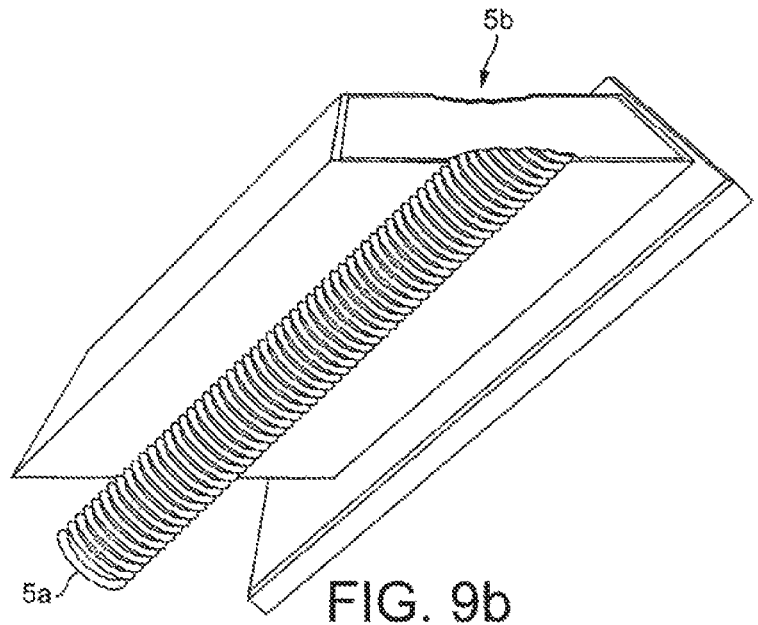
Figure 9C:
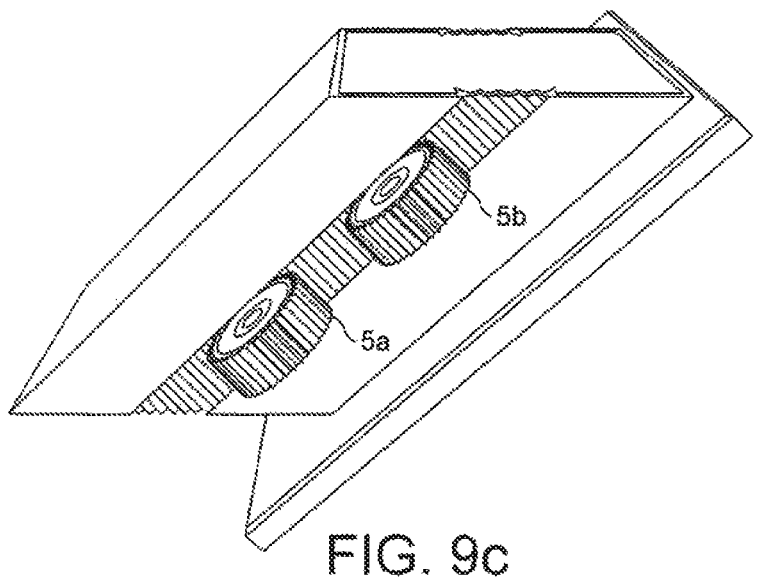
Figure 9D:
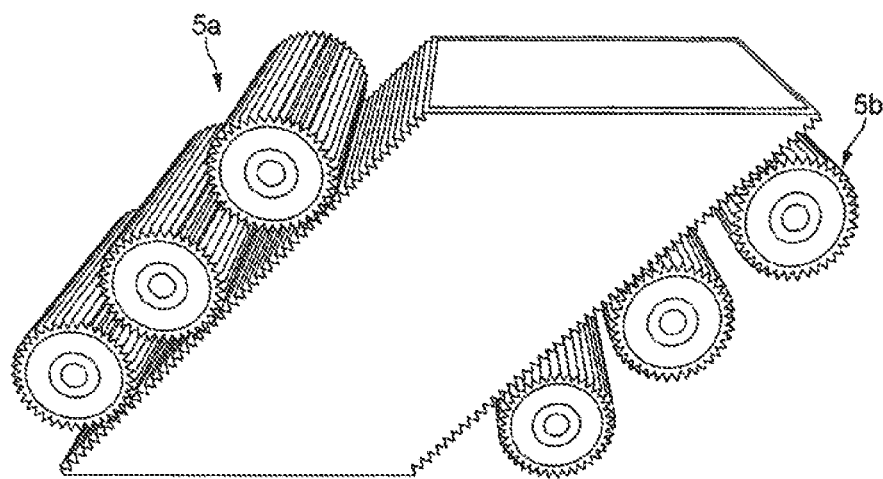
Figure 9E:
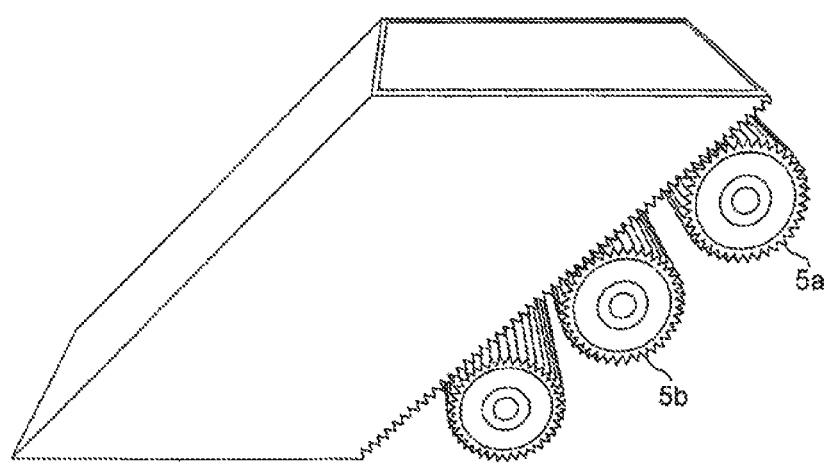
Figure 9F:
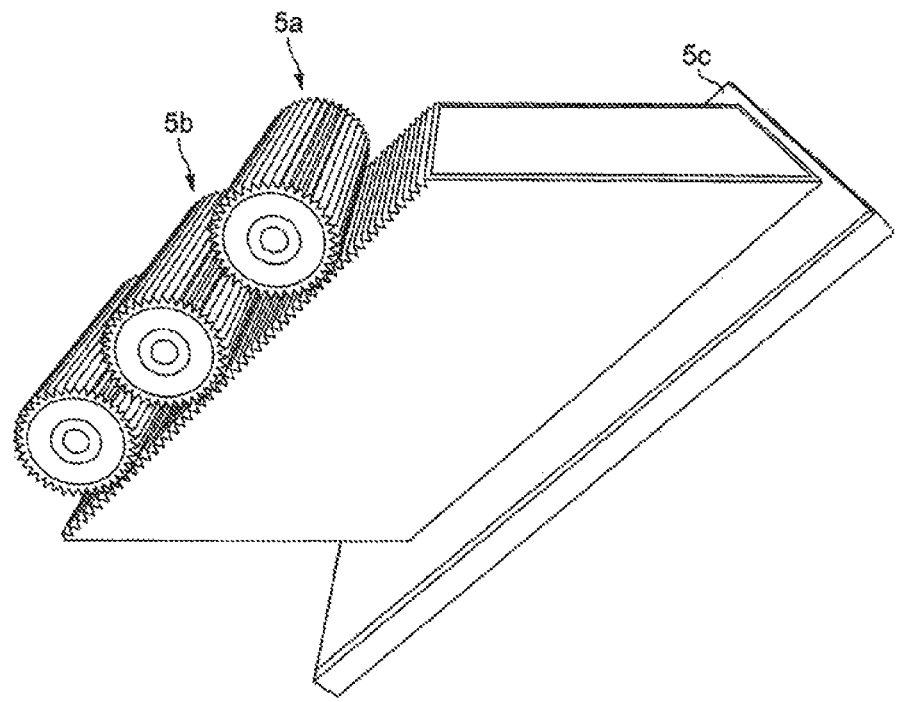

In FIG. 9*a*, grippers 5*a*, 5*b* having toothed gripping surfaces are arranged on one side only of an inclined column. The opposite face of the inclined column may face a smooth sliding surface. In FIG. 9*b*, screws 5*a*, 5*b* are arranged on two sides of an inclined column which are not inclined sides. At least the inclined underside, and optionally the opposite face to the inclined underside of the column, faces a smooth sliding surface. In FIG. 9*c*, toothed gears 5*a*, 5*b* are arranged on two sides of an inclined column. At least the inclined underside, and optionally the opposite face to the inclined underside of the column, faces a smooth sliding surface. In FIG. 9*d*, toothed rollers 5*a*, 5*b* are arranged on two inclined sides of an inclined column. In FIG. 9*e*, toothed rollers 5*a*, 5*b* are arranged to face an underside of an inclined column. Optionally, the opposite face to the inclined underside of the column may face a smooth sliding surface. In FIG. 9*f*, a smooth sliding surface 5*c* is arranged to face an underside of an inclined column. Toothed rollers 5*a*, 5*b* are arranged to face the opposite face to the inclined underside of the column. The number and arrangement of the various support and gripping elements may be varied without limitation.

In some configurations, multiple tables could be provided, over which a common print head, material dispenser, smoothing unit and the like as required may be arranged to be movable. Some variants may provide several build regions arranged in a common plane. For example, multiple wells defining build regions could be formed in the top surface of a common table. Each build region may be associated with its own feed mechanism and, optionally, its own conveyor. Such a configuration would then be able to manufacture multiple objects individually enclosed in support structures simultaneously in a continuous process. The feed mechanism associated with each well can have a similar construction for simplicity. Examples of such variants are shown in FIGS. 10*a* to 10*c*.

Figure 10A:
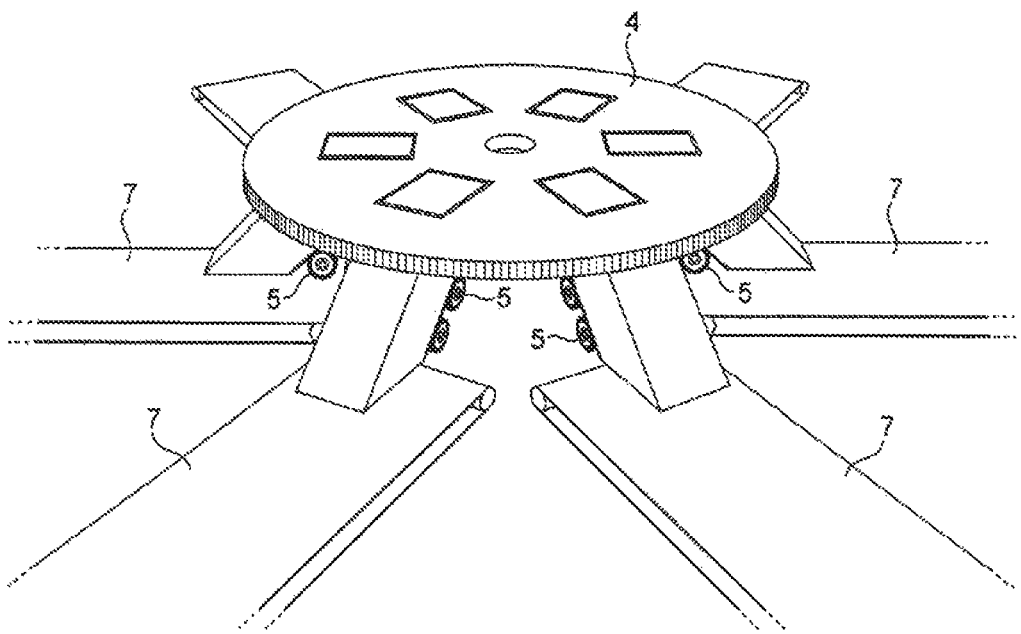
FIGS. 10a to 10c are views of alternative embodiments in which multiple build regions and feed mechanisms are provided associated with a single manufacturing system.

FIG. 10*a* shows the application to a rotary table having six build regions in a common, fixed table 4, each comprising a rack-and-pinion feed mechanism 5 extending downwardly and radially outwardly of the centre of the table about which the common print head, material dispenser, smoothing unit and the like rotate. Each feed mechanism terminates at an associated conveyor 7, which in the displayed configuration translates released support structures radially away from the table.

Figure 10B:
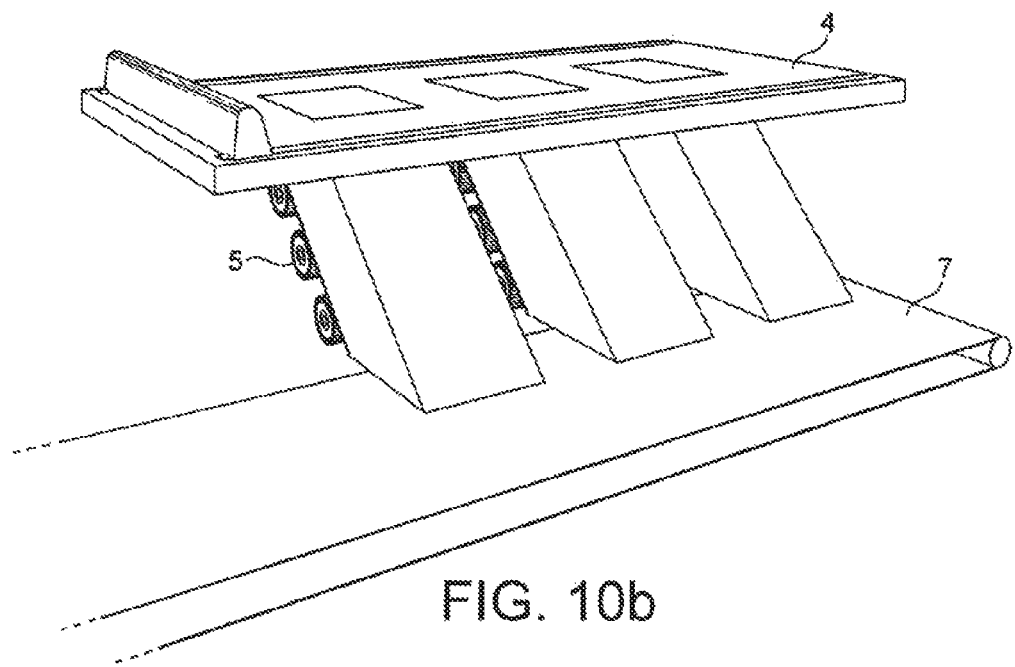
Figure 10C:
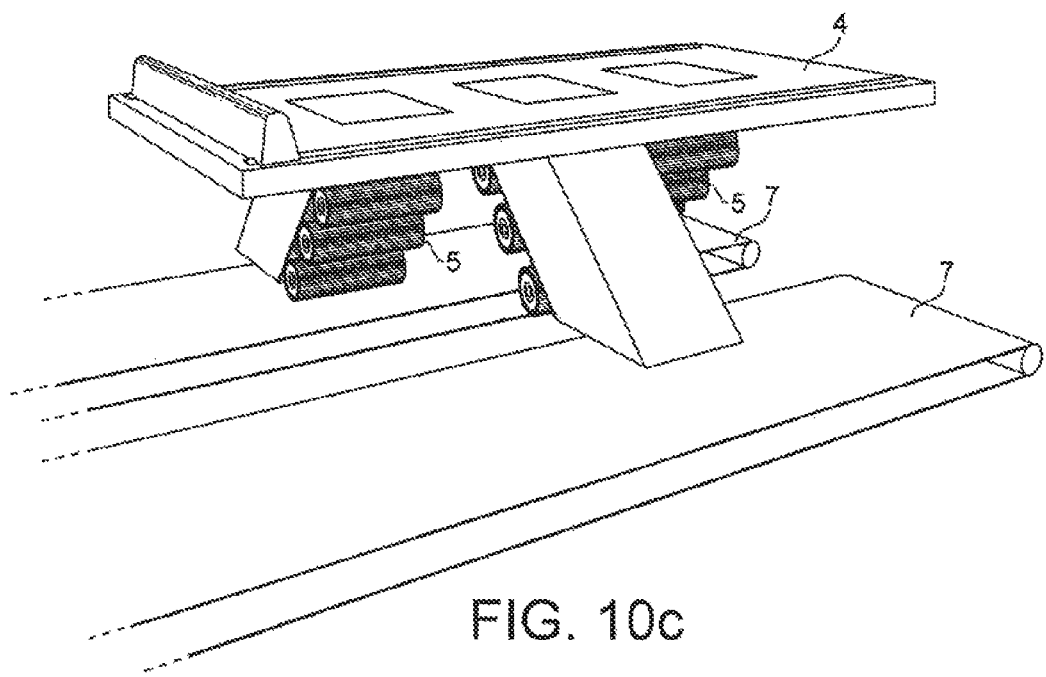

FIG. 10*b* shows the application to a linear table 4 having three build regions, each comprising a rack-and-pinion feed mechanism 5 extending downwardly and laterally away in the same direction from the line along which the common print head, material dispenser, smoothing unit and the like translate. Each feed mechanism terminates at a common conveyor 7, which in the displayed configuration translates released support structures away from the table in parallel to the translation direction of the material dispenser. Alternatively, each feed mechanism may terminate at a separate associated conveyor FIG. 10*c* shows the application to a linear table 4 having three build regions, each comprising a rack-and-pinion feed mechanism 5 extending downwardly and laterally from the line along which the common print head, material dispenser, smoothing unit and the like translate. Two of the feed mechanisms extend in one direction away from the line, while one feed mechanism extends in an opposite direction. Each feed mechanism terminates at an associated conveyor 7, which in the displayed configuration translates released support structures away from the table in parallel to the translation direction of the material dispenser. Two of the feed mechanisms share a common conveyor, while the other feed mechanism is associated with another conveyor, where in this variant extends in the same direction as the common conveyor.

Figure 11A:
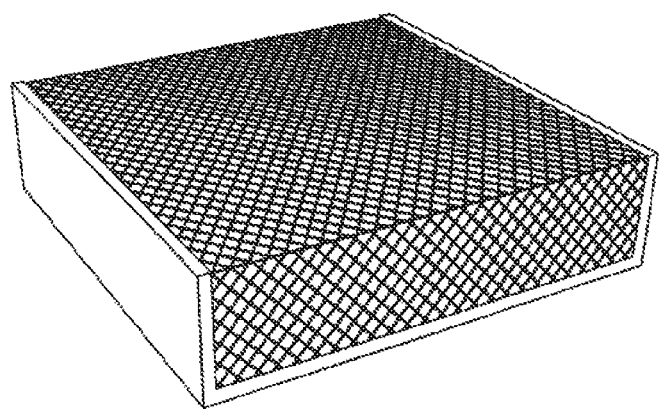
FIGS. 11a to 11e are views of various configurations of support structures.
Figure 11B:
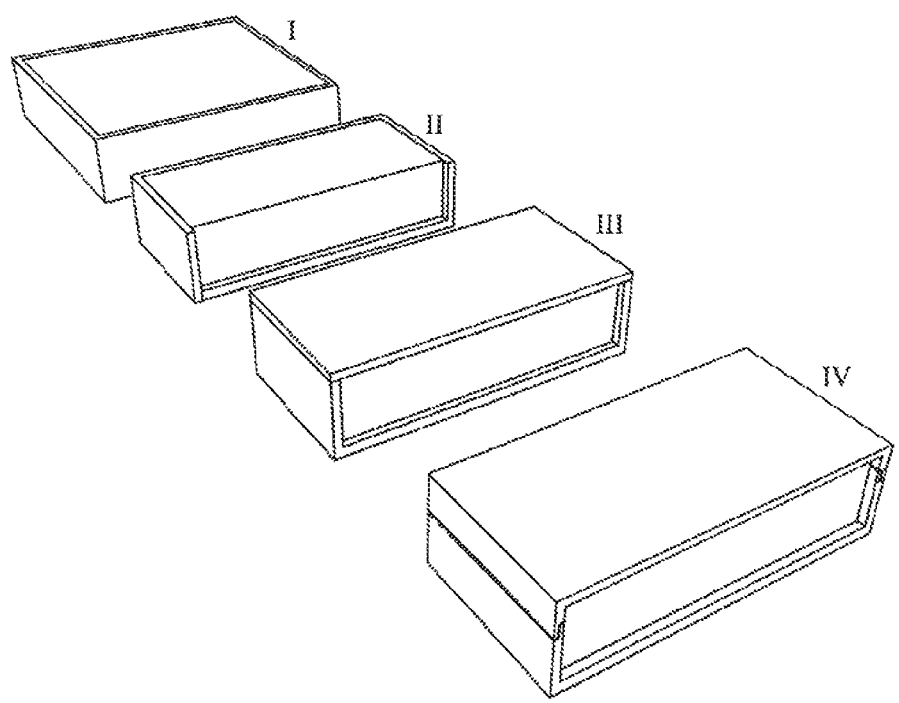

The configuration of the support structure is also not especially limited. The embodiments of FIGS. 1 to 5 may use, for example, an open-topped cuboidal box fully closed on all sides and at the bottom surface. However, alternative configurations are possible. FIG. 11*a*, for example, shows a support structure in the form of a cuboidal box in which a top surface and two opposite side walls are formed of a mesh. FIG. 11*b*, for example, shows a series of cuboidal box support structures I to IV having respectively: I, an open top; II, an open top and one open side wall; III, an open side wall and a separable top portion; IV: an open side wall and a separable top portion which extends partially down a pair of opposing side walls. The support structures having separable portions may be formed with a small region of unbound or loosely-bound material between the separable portion and the remainder of the support structure, so that the support structure may be fractured at the unbound or loosely-bound material to open the support structure, thereby to easily access an enclosed object. Such unbound or loosely-bound regions may be generated by reducing the amount of binder supplied to the unbound regions, or by connecting the separable portion to the remainder of the structure by a porous region in which bound connecting portions extend from the separable portion to the remainder of the structure but are themselves separated by unbound material. This latter approach is analogous to the provision of perforations in a sheet of paper allowing easy separation along the perforations.

Figure 11C:
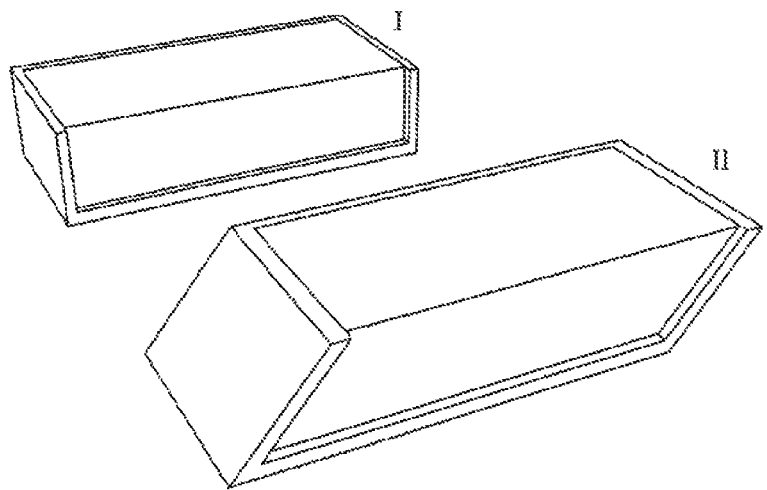

Also, FIG. 11*c* shows a comparison between a support structure I of cuboidal form and a support structure II of inclined parallelepiped form. The latter structure may be of especial utility with inclined feed mechanisms such as those shown in FIGS. 9*a* to 9*e*.

Figure 11D:
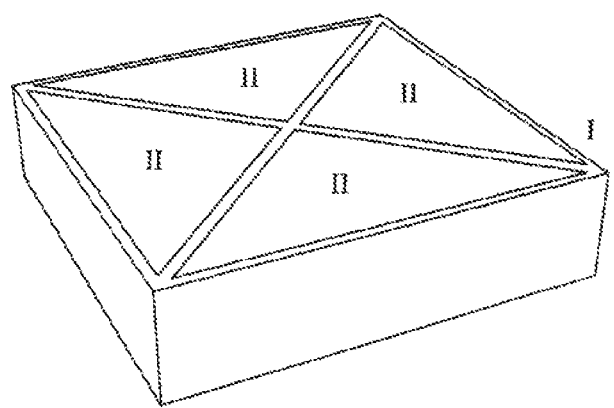

As a further possibility, FIG. 11*d* shows a support structure I which is internally divided into compartments II in each of which an object may be formed. Such a configuration may have improved strength against handling.

Figure 11E:
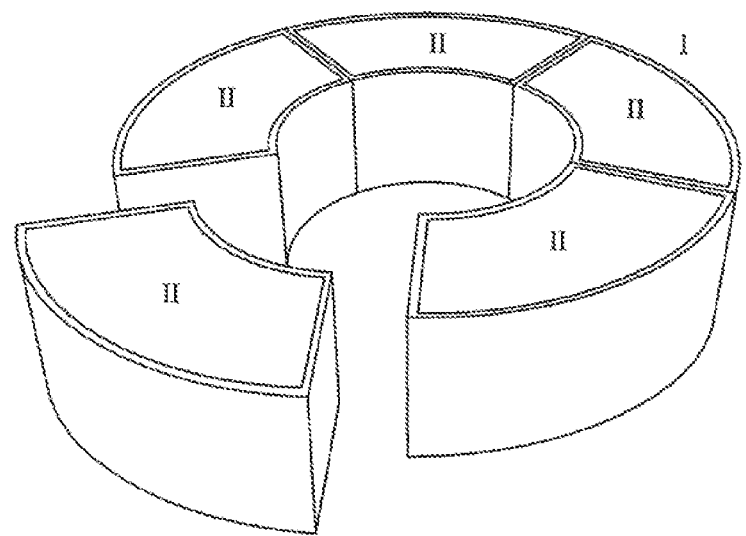
Figure 12:
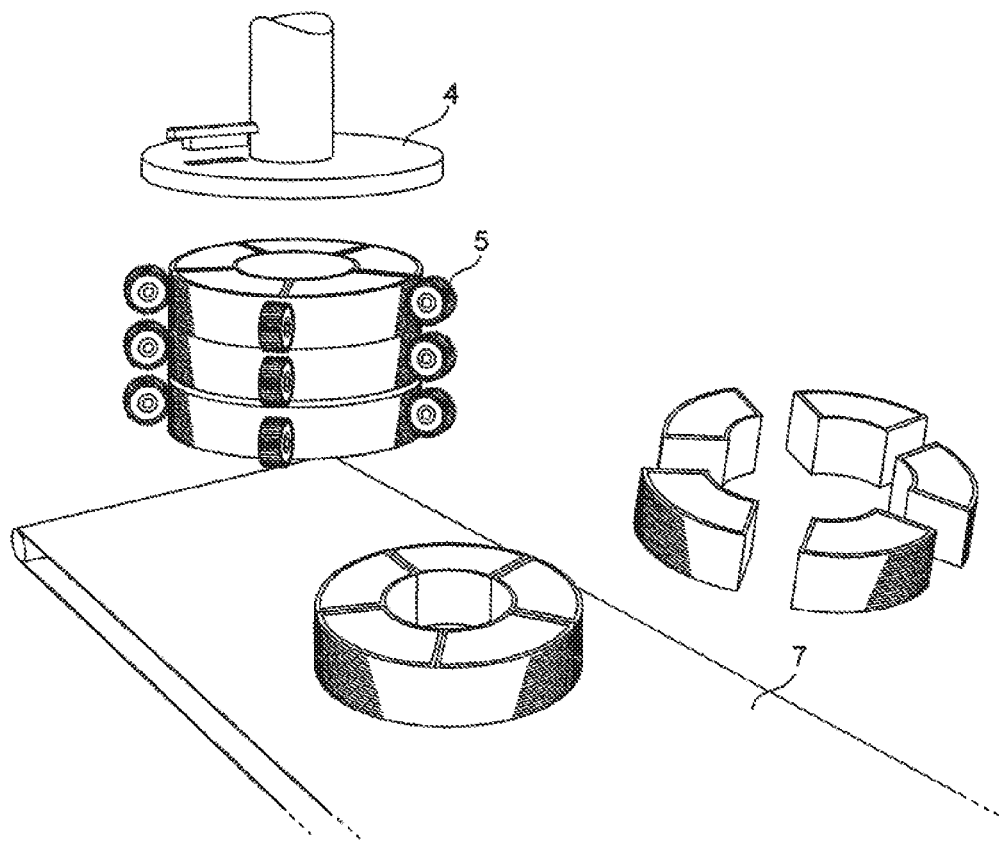
FIG. 12 shows how the support structure of 11e can be provided in connection with the feed mechanism of FIG. 8c.

Finally, FIG. 11e shows an alternative divided support structure I of annular form which may be separated along unbound or weakly-bound regions to be divided into, for example, five smaller containers II, each representing, for example, a sector of the annulus. Such a configuration may be especially useful in connection with the rotary table shown in FIG. 8d, as shown in FIG. 12.

As to the powder and binder, there are no specific requirements. In one contemplated variation, a different binder is used to form the support structure as compared with the object. Alternatively, a different joining or binding technique may be used to form the support structure as compared with the object. This would allow the support structure to be manufactured by temporary or weak binding, for example with a soluble polymer binding metal powder together, while any manufactured object contained within the metal powder could be manufactured by a stronger binding, such as laser sintering. Such a configuration would allow the metal powder used in the construction of the support structure to be recycled by washing with an appropriate solvent to unbind the powder, while the manufactured object would be substantially unaffected by such washing. Further, such an approach may allow objects contained within the support structure to be easily released, for example by spraying or immersing the support structure with a suitable solvent which would unbind and wash away the powder of the support structure and the unbound powder surrounding the object, leaving the manufactured object unaffected.

The technique is equally applicable to other types of 3D printing and related manufacturing techniques, including laser sintering, heat sintering, photopolymerisation of liquid, or extrusion of construction material and support material in layers, without limitation. All that is required is an appropriate modification to the print head and/or dispenser as may be easily appreciable by those skilled in the art.

While the above disclosure has been explained in connection with a square or rectangular build region over which a powder dispenser and a print head travels linearly back and forth in at least a first direction, the technique is also applicable to an apparatus having a circular well, defining a circular build region, above which a continuously rotating radial powder dispenser and continuously rotating radial print head sequentially pass. Such a configuration is shown in FIG. 7d. Indeed, such a situation may be even further preferable, since the support structure is not part of the manufactured object, and thus need only be printed with low resolution at the edges of such a circular printing arrangement, while the object may be positioned centrally in the well and thus may be printed with a relatively higher spatial resolution.

Of course, the movement of the print head and powder dispenser on the one hand and the build region on the other hand need only be relative, and in practice the print head and powder dispenser could be fixed relative to an external reference frame, such as a base frame, while the table, build region and feed mechanism moves relative to the external reference frame. In practice, for most applications the print head and powder dispenser are easier to arrange as being movable relative to any external reference frame.

The embodiment of FIG. 1 advantageously uses box-like support structures of fixed height, since the spacing of the first and second pairs of grippers may be appropriately adjusted to ensure that sequential support structures are always securely held. In contrast, the belt-type configuration of FIG. 4 is able to accommodate a variety of heights of boxes within the continuous powder column.

Minimally, for some powders, the box need have only side wall support portions. However, for improved containment of powder, a support structure having a bottom portion and, optionally, a top portion may be selected. The bottom portion and the top portion may advantageously be mutually parallel to facilitate handling of the support structure, while the side portions will generally correspond to the dimensions and geometry of the build area in plan.

The above disclosure is intended to be non-limiting on the disclosed invention, and accordingly the appended claims are to be interpreted as encompassing all variations, modifications, substitutions and equivalents as may be achievable by the skilled person in implementing the above disclosure. All disclosed configurations may be combined without limitation, and applicable concepts from one disclosed configuration may be applied to other disclosed configurations, without limitation.

The invention claimed is:

1. An apparatus for manufacturing a series of objects, the apparatus comprising:
   a build region;
   a dispensing unit configured to deposit layers of a manufacturing medium into the build region in which portions of object layers are selectively bound together;
   a supporting unit disposed below the build region and configured to support a lower layer below the object layers by edges of the lower layer and to translate the lower layer downwards away from the build region; and
   a receiver configured to receive an object and transport the object away from the supporting unit,
   wherein the apparatus is configured to form a surrounding structure with deposited layers of manufacturing medium, the apparatus being configured to selectively bind portions of successive layers in the build region so as to form an object surrounded by the surrounding structure and to support the surrounding structure with the supporting unit at least after formation of the object,
   wherein the apparatus is configured to bind different portions of the manufacturing medium with different binding strengths such that the surrounding structure is formed of portions having a weaker binding strength as compared to the object such that the surrounding structure is configured to be released from the object after the object is formed,
   wherein the apparatus defines a well, the well having an upper opening and a lower opening, both the upper opening and the lower opening being at least as large as the object and the surrounding structure in combination, the dispensing unit being configured to deposit layers of the manufacturing medium in the upper opening of the well, the supporting unit being configured to remove the object and the surrounding structure from the well through the lower opening and to move the object and the surrounding structure onto the receiver after removing the object and the surrounding structure from the well, and
   wherein the supporting unit is disposed below an entirety of the well and above an entirety of the receiver.

2. The apparatus according to claim 1, wherein the supporting unit comprises a pair of opposing grippers arranged to apply gripping force to the lower layer in mutually opposing directions.

3. The apparatus according to claim 2, wherein each gripper has a clamping surface arranged parallel to a wall of the surrounding structure for gripping the lower layer at the edges of the lower layer and being movable together with the other gripper of the pair of grippers away from the build region to translate the lower layer downwards.

4. The apparatus according to claim 2, wherein the apparatus comprises a further pair of opposing grippers arranged to apply gripping force to the lower layer in mutually opposing directions at a non-zero angle to the mutually opposing directions of the pair of grippers.

5. The apparatus according to claim 2, wherein each gripper comprises an endless belt having a gripping surface arranged parallel to a wall of the surrounding structure and configured to contact and support the lower layer while progressively translating the lower layer downward and away from the build region.

6. The apparatus according to claim 1, wherein the receiver is configured to receive the supporting structure after the supporting unit releases the lower layer.

7. The apparatus according to claim 1, wherein the apparatus further comprises a selective binding unit adapted to bind different portions of the layer with different binding strengths such that the surrounding structure is formed of regions having a different binding strength as compared to the object.

8. The apparatus according to claim 1, wherein the binding of the surrounding structure is by means of a soluble binder and the apparatus is adapted subsequently to release the binding of the surrounding structure by applying an appropriate solvent for releasing the binding.

9. The apparatus according to claim 8, wherein the apparatus is adapted to apply the appropriate solvent by spraying the surrounding structure with or immersing the surrounding structure in the appropriate solvent.

10. The apparatus according to claim 8, wherein the soluble binder is a soluble polymer.

11. The apparatus according to claim 1, wherein the binding of the surrounding structure is released to release the object from the surrounding structure.

12. The apparatus according to claim 1, wherein the apparatus is adapted to recycle the manufacturing medium used in the construction of the support structure after the binding thereof is released.

13. The apparatus according to claim 1, wherein the construction medium is metal powder.

14. The apparatus of claim 1, wherein the support unit is configured to support the surrounding structure at edges of layers forming the surrounding structure while translating the surrounding structure downwards away from the build region towards a removal region located below the build region,
wherein the support unit is configured to simultaneously support at least two sequential support structures containing respective objects arranged vertically such that when a lower support structure is released, an upper support structure remains supported and is translated downwards to replace the lower support structure.

15. The apparatus according to claim 1, wherein the receiver includes a conveyor configured to transport the object.

16. A method of manufacturing a series of objects, the method comprising:
providing the apparatus of claim 1;
providing a layer of the manufacturing medium;
binding portions of the layer of the medium together at least in edge regions of the layer to form a support portion;
lowering the support portion while gripping the support portion by the edge regions of the layer;
providing a further layer of the medium supported by the support portion; and
selectively binding portions of the further layer of the medium to form at least an object portion.

17. The method according to claim 16, further comprising:
further lowering the support portion;
providing a yet further layer of the medium on the further layer;
binding portions of the yet further layer of the medium together to form a further support portion;
gripping the further support portion by the edge regions of the further layer; and
releasing the support portion.

18. The method according to claim 16, wherein layers of the medium including the layer and the further layer constitute a continuous column.

19. The method according to claim 16, further comprising selectively binding portions of the further layer to form additional support portions connected to the support portion such that the object portion is surrounded by the additional support portions within the layer.

20. The method of claim 19, wherein the support portion and additional support portions form a box.

21. The method according to claim 16, wherein different portions of the manufacturing medium are bound with different binding strengths such that the support portion is formed of portions having a different binding strength as compared to the object portion.

22. The method according to claim 21, wherein the binding of the support portion is weaker than the binding of the object portion, and the binding of the support portion is subsequently released after the object portion is formed.

23. The method according to claim 22, wherein the binding of the support portion is by means of a soluble binder and the binding of the support portion is subsequently released by applying an appropriate solvent for releasing the binding.

24. The method according to claim 23, wherein the appropriate solvent is applied by spraying the support portion with or immersing the support portion in the appropriate solvent.

25. The method according to claim 22, wherein the binding of the support portion is released to release the object from the support portion.

26. The method according to claim 22, wherein the manufacturing medium used in the construction of the support portion is subsequently recycled after the binding thereof is released.

27. The method according to claim 22, wherein the soluble binder is a soluble polymer.

28. A method of manufacturing a series of objects, comprising:
providing the apparatus of claim 1;
selectively binding portions of sequential layers of a column of the manufacturing medium so as to form a series of support structures surrounding a series of objects; and
translating the column of manufacturing medium downwards while adding further layers of manufacturing medium at the top of the column and removing support structures from the bottom of the column, the column of manufacturing medium being supported by one support structure that is located at the bottom of the column and that is externally supported by the sides of the support structure.

29. A method of manufacturing a series of objects, the method comprising:
- providing the apparatus of claim 1;
- depositing into the build region successive layers of manufacturing medium having portions selectively bound together to form a first object surrounded by a first support structure that is arranged at least at an edge region of the successive layers;
- externally supporting the first support structure at edges of layers forming the first support structure while translating the first support structure downwardly away from the build region;
- depositing further successive layers of manufacturing medium having portions selectively bound together to form a second object surrounded by a second support structure arranged at an edge region of the further successive layers;
- externally supporting the second support structure at edges of layers forming the second support structure while the first support structure is externally supported;
- releasing the first support structure once the second support structure is externally supported; and
- removing the first support structure containing the object after release of the first support structure from a removal position below the build region.

30. An apparatus for manufacturing a series of objects, the apparatus comprising:
- a build region;
- a dispensing unit configured to deposit layers of a manufacturing medium into the build region in which portions of object layers are selectively bound together;
- a supporting unit disposed below the build region and configured to support a lower layer below the object layers by edges of the lower layer and to translate the lower layer downwards away from the build region; and
- a receiver configured to receive the object and transport the object away from the supporting unit,
- wherein the apparatus is configured to form a surrounding structure with deposited layers of manufacturing medium, the apparatus being configured to selectively bind portions of successive layers in the build region so as to form an object surrounded by the surrounding structure and to support the surrounding structure with the supporting unit at least after formation of the object,
- wherein the apparatus is configured to bind different portions of the manufacturing medium with different binding strengths such that the surrounding structure is formed of portions having a weaker binding strength as compared to the object such that the surrounding structure is configured to be released from the object after the object is formed,
- wherein the apparatus defines a well, the well having an upper opening and a lower opening, both the upper opening and the lower opening being at least as large as the object and the surrounding structure in combination, the dispensing unit being configured to deposit layers of the manufacturing in the upper opening of the well, the supporting unit being configured to move the object and the surrounding structure out of the lower opening of the well and onto the receiver,
- wherein the receiver includes a conveyor configured to transport the object,
- wherein the supporting unit comprises a pair of opposing grippers configured to apply gripping force to the surrounding structure in mutually opposing directions, the grippers being configured to independently translate upward and downward relative to the well and to independently extend inward and retract outward relative to the well.

* * * * *